US007010610B1

(12) United States Patent
Ringhof et al.

(10) Patent No.: US 7,010,610 B1
(45) Date of Patent: *Mar. 7, 2006

(54) PROGRAMMABLE AGENT WORKSTATION SYSTEM AND METHOD

(75) Inventors: Paul G. Ringhof, Boca Raton, FL (US); Edward J. Dahmus, Boca Raton, FL (US); Ran R. Cohen, Haifa (IL); Roni Klimer, Yogneam Filit (IL); Uzi U. Shvadron, Mitzpe Aviv (IL); Julio Wong, Pembroke Pines, FL (US); Danny J. Hood, Deerfield Beach, FL (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/576,166

(22) Filed: May 22, 2000

(51) Int. Cl.
  *G06F 15/16* (2006.01)
(52) U.S. Cl. .................. 709/232; 719/328; 715/727
(58) Field of Classification Search ............... 370/352, 370/353, 356, 270; 379/265; 709/225, 224; 455/557, 555; 345/717; 719/328; 715/727
  See application file for complete search history.

(56) References Cited

U.S. PATENT DOCUMENTS

| 5,946,386 | A | * | 8/1999 | Rogers et al. | 379/265 |
|---|---|---|---|---|---|
| 5,956,024 | A | * | 9/1999 | Strickland et al. | 345/717 |
| 6,044,403 | A | * | 3/2000 | Gerszberg et al. | 709/225 |
| 6,122,665 | A | * | 9/2000 | Bar et al. | 709/224 |
| 6,269,254 | B1 | * | 7/2001 | Mathis | 455/557 |
| 6,337,858 | B1 | * | 1/2002 | Petty et al. | 370/356 |
| 6,366,578 | B1 | * | 4/2002 | Johnson | 370/353 |
| 6,430,174 | B1 | * | 8/2002 | Jennings et al. | 370/352 |
| 6,449,260 | B1 | * | 9/2002 | Sassin et al. | 370/270 |
| 6,539,237 | B1 | * | 3/2003 | Sayers et al. | 455/555 |
| 6,654,457 | B1 | * | 11/2003 | Beddus et al. | 379/265.02 |

OTHER PUBLICATIONS

Gang Bai, Keping Long, Wendong Wang, Shiduan Cheng; "A New Reliable Signalling Transport Protocol RSTP for Voice Over IP"; 1999; Communications; vol. 1; pp. 263-266.*

Cravotta, Nicholas; "Voice Over Packet—Putting It All Together", Electronic Magazine, Mar. 16, 2000, pp. 107-118.

* cited by examiner

*Primary Examiner*—John Follansbee
*Assistant Examiner*—Dustin Nguyen
(74) *Attorney, Agent, or Firm*—Jon A. Gibbons; Fleit, Kain, Gibbons, Gutman, Bongini & Bianco P.L.

(57) ABSTRACT

A programmable workstation system and method for network based call center with telephony functions provided over the IP network and using a personal computer is disclosed. For such automated call centers there exists a need to coordinate the telephony functions with agent availability functions. Existing solutions use a switch and PSTN phone to communicate information to an automated call director (ACD). The present invention solves the problem of doing similar reporting and with coexistence of telephony functions along with agent data functions. Features of invention include (a) special protocols to relay agent information to Virtual ACD and coexist with H.323 signaling and (b) the ability to relay agent status and provide screen based interface to agent also for such information for agent availability and alerting. The system disclosed generally incorporates JavaPhone (105, 4400), PlusTcp (109, 5500), and PlusTapi (110, 6600) APIs with associated method functions to implement the major functions.

26 Claims, 17 Drawing Sheets

☐ PlusTcp conversation number for telephony support (1-8)

☐ TCP/IP address of telephony support (or "LocalHost")

☐ TCP/IP port number of telephony support

☐ Timeout for initialization of telephony support (seconds)

☐ Timeout for establishing telephony connection (seconds)

☐ Timeout for allowing operator to replug headset (seconds)

☐ TCP/IP address of Call Director Custom Server

☐ TCP/IP address of Voice Over Data Custom Server

FIG. 17

| -Field1- | -Field4- | -Field5- | -Field3- | -Field11- | -Field9- |
|---|---|---|---|---|---|
| -Field2- | -Field6- | -Field7- | -Field13- | -Field12- | -Field10- |

FIG. 18

| CallOn Hold | Calling: | 123-456-7890 | Call Active | Volume: | 60 |
|---|---|---|---|---|---|
| Mute | Called: | 987-654-3210 | | Microphone: | 50 |

FIG. 19

PROGRAMMABLE AGENT WORKSTATION SYSTEM AND METHOD

STATEMENT REGARDING FEDERALLY SPONSORED RESEARCH OR DEVELOPMENT

Not Applicable

REFERENCE TO A MICROFICHE APPENDIX

Not Applicable

FIELD OF THE INVENTION

The invention is related in the general area of network call centers and programmable agent workstations.

BACKGROUND OF THE INVENTION

Overview

The present invention discloses a programmable workstation system and method for network based call center with telephony functions provided over the IP network and using a personal computer. For such call center, there is a need to coordinate the telephony functions with agent availability functions. Existing solutions use a switch and PSTN phone to communicate information to an automated call director (ACD). There is a need to solve the problem of doing similar reporting and with coexistence of telephony functions along with agent data functions. Features of invention include (a) special protocols to relay agent information to Virtual ACD and coexist with H.323 signaling and (b) the ability to relay agent status and provide screen based interface to agent also for such information for agent availability and alerting.

General System Architecture

The general system architecture of the present invention is illustrated in FIG. 1, with the agent workstation (1121) being the focus of the present invention teachings.

DESCRIPTION OF THE PRIOR ART

Existing solutions to the problem solved by the present invention use a switch and PSTN phone to communicate information to an automated call director (ACD). However, there have been recent efforts to integrate these functions. See Nicholas Cravotta, "Voice Over Packet—Putting it all Together", ELECTRONIC DESIGN MAGAZINE, pages 107–118 (Mar. 16, 2000).

Referencing FIG. 1, the present state of the art includes telephone equipment (1101), public switched telephone networks (1102), and public branch exchanges (1103). Remaining elements in this figure may be incorporated using the teachings of the present invention to provide features not present in the prior art.

OBJECTS OF THE INVENTION

Accordingly, the objects of the present invention are (among others) to circumvent the deficiencies in the prior art and affect one or more of the following objectives:

1. Integration of VoIP into a Directory Assistance System (DAS) operator position, allowing the operator to either manually (through key presses) or programmatically (through macro command invocations) to control voice-related parameters (such as microphone level and headset level) and call-related parameters (sign on, audio release, position release, not ready).
2. Ability for one or more DLL applications, running on the Intelligent Workstation Platform (IWSP), to open from 1–8 client TCP/IP socket connections to other applications, running either on the same PC or elsewhere in the network. The PlusTapi (109, 5500) application was one such DLL. The PlusTcp DLL (109, 5500) that provided this support, generated advisements back to any of the other IWSP DLLs when data was received. The PlusTcp DLL (109, 5500) also returned error codes to the owing DLL whenever a TCP/IP exception occurred. The owning DLL could subsequently call a PlusTcp API that would return a string that contained a textual message for the corresponding error code. The textual message would be generated in whatever language (English, Spanish, etc.) was currently selected on the position, which would be subsequently displayed to the operator.
3. Invocation of macros through events being generated from the PlusTapi-JavaPhone interface. Macros were used for updating screen displays or performing other operations defined to the IWSP workstation. PlusTapi macro invocations allow the user to generate flexible displays, informing the operator of the various events (call arrival, call termination, headset volume adjustments, etc.). PlusTapi macro commands also allowed the user to invoke various controls in the JavaPhone (e.g., make ready/not ready, audio release, etc.).
4. PlusTapi included a TCP/IP "ping" macro command that would, with a single key press or programmatically through the DDE protocol or the IWSP DLL API, issue a ping request through the JavaPhone application (105, 4400) to the Call Director (103, 1110) and then display the results back to the operator in a Windows™ Messagebox.
5. PlusTapi (109, 5500) supports two modes of operation—one in which macro command failures would generate message box displays to the operator, and one in which macro command failures would generate return codes to the invoking application. The mode that PlusTapi operates in is controlled through a macro command and can be dynamically changed as required.

While these objectives should not be understood to limit the teachings of the present invention, in general these objectives are achieved by the disclosed invention that is discussed in the following sections.

BRIEF SUMMARY OF THE INVENTION

Overview

The invention is related in the general area of a programmable workstation for network based call center with telephony functions provided over the IP network and using a personal computer. For such call center, there was a need to coordinate the telephony functions with agent availability functions. Existing solutions use a switch and PSTN phone to communicate information to an ACD. We need to solve the problem of doing similar reporting and do coexistence of telephony functions along with agent data functions. Features of invention (1) Special protocol to relay agent information to Virtual ACD and coexist with H.323 signaling (2) Ability to relay agent status and provide screen based interface to agent also for such information for agent availability and alerting.

Generalized System Architecture

IP based agent technology is evolving for IP call centers. The major problems with legacy call centers have been proprietary interfaces for service creation within switches that are complex to change. Most switch vendors control what information is accessible and makes development of new services very difficult.

Referencing FIG. 2, the present invention when incorporated into a system environment (2200) enables a virtual ACD environment (2203) with integrated Voice response unit (VRU) and Virtual Automatic Call Distributor (VACD) (1114) to have a programmable interface (1121) with a common script logic so that the complete call flow can be executed in a single process. The operator interface (1122) may take a variety of forms.

BRIEF DESCRIPTION OF THE DRAWINGS

The file of this patent contains at least one drawing/photograph executed in color. Copies of this patent with color drawings/photographs is provided by the Patent and Trademark Office upon request and payment of the necessary fee.

For a fuller understanding of the advantages provided by the invention, reference should be made to the following detailed description together with the accompanying drawings wherein:

FIG. 17 illustrates an exemplary PlusTapi utility mode panel used in some embodiments of the present invention;

FIG. 18 illustrates an exemplary InfoWin utility settings for CSW used in some embodiments of the present invention;

FIG. 19 illustrates an exemplary CSW running in normal mode used in some embodiments of the present invention;

DESCRIPTION OF THE PRESENTLY PREFERRED EXEMPLARY EMBODIMENTS

Embodiments are Exemplary

Figure 1:
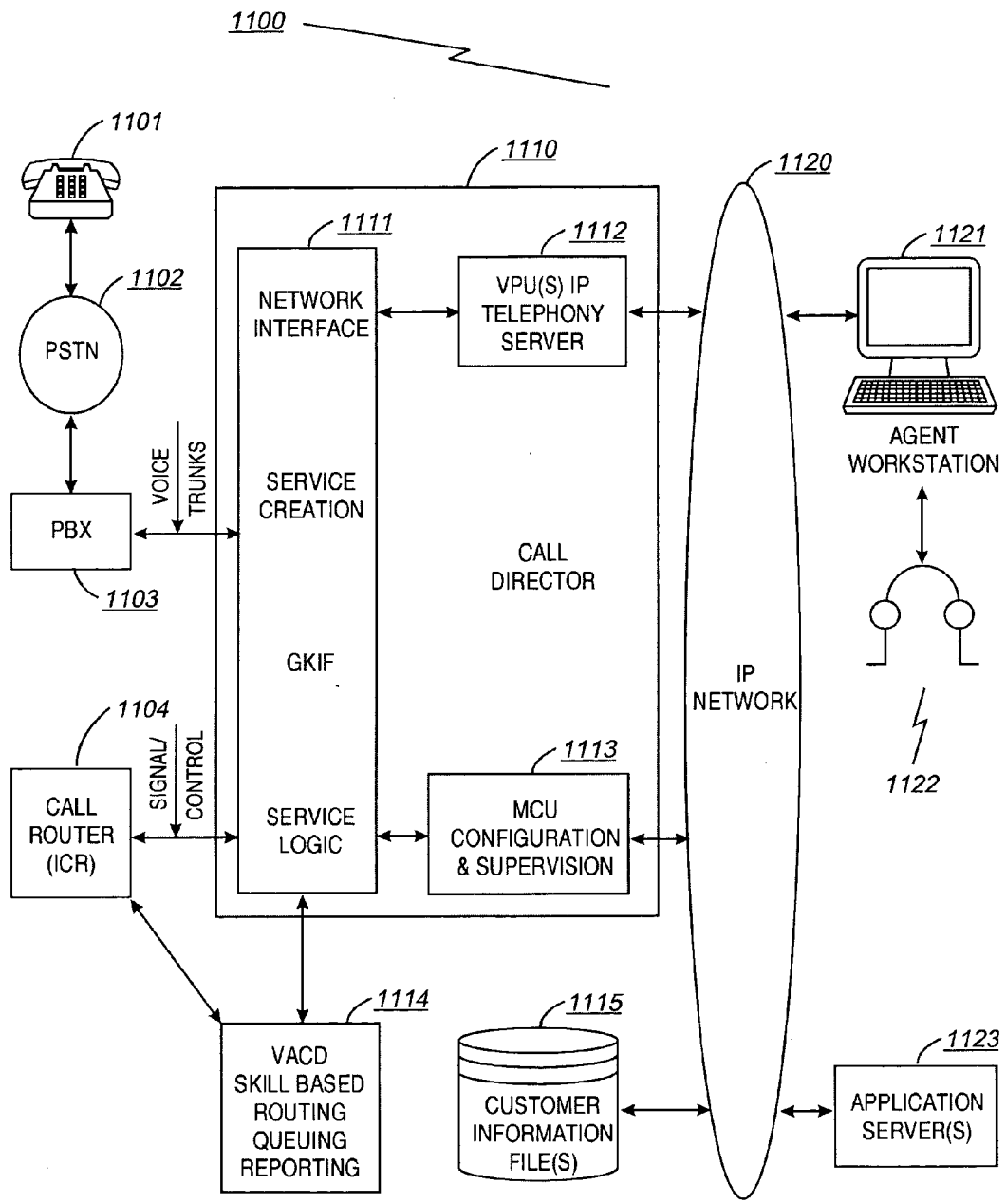
FIG. 1 illustrates an exemplary system application environment of the present invention.
Figure 2:
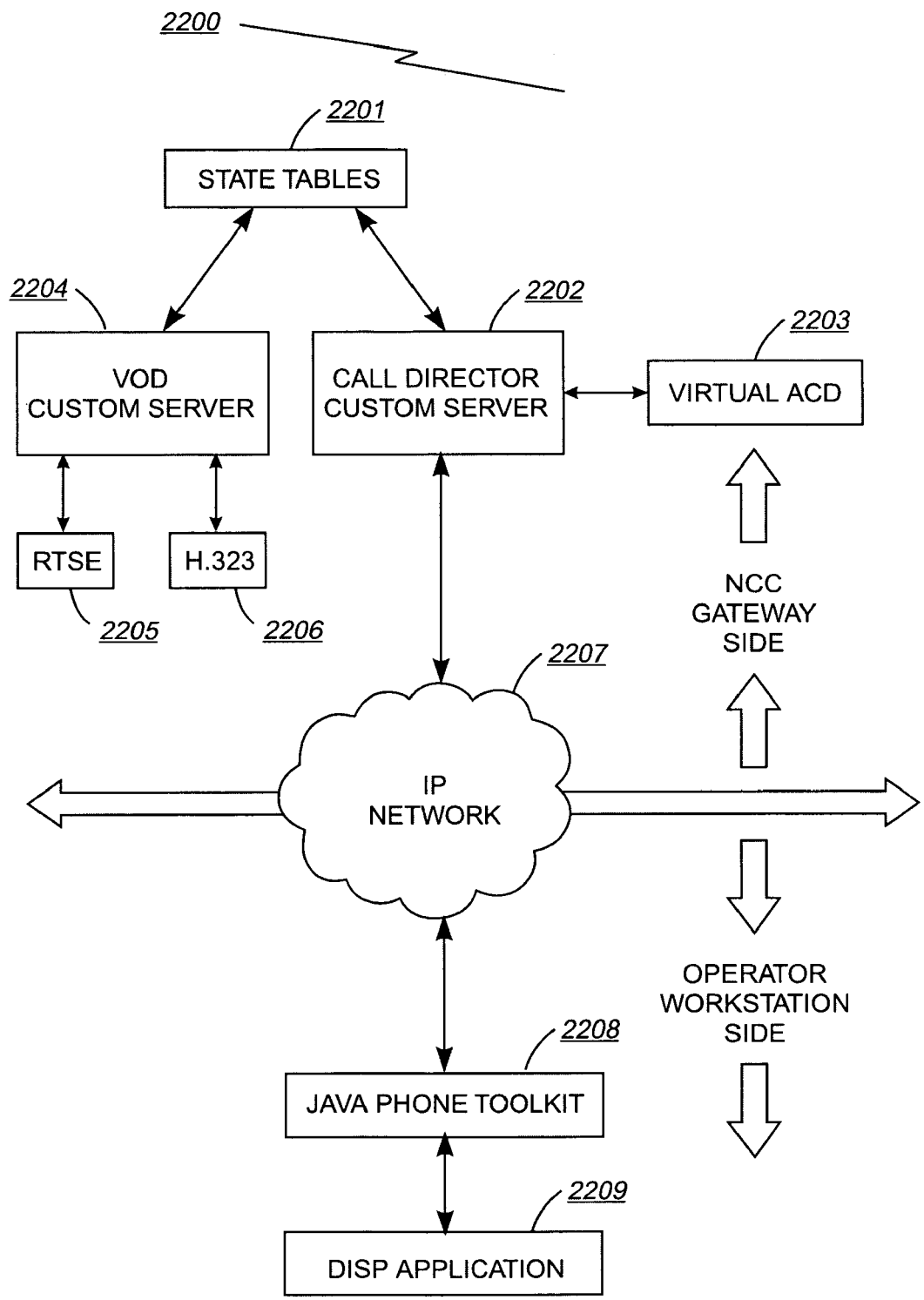
FIG. 2 illustrates an exemplary data flow architecture diagram supporting the present invention teachings.

While this invention is susceptible of embodiment in many different forms, there is shown in the drawings and will herein be described in detailed preferred embodiment of the invention with the understanding that the present disclosure is to be considered as an exemplification of the principles of the invention and is not intended to limit the broad aspect of the invention to the embodiment illustrated.

The numerous innovative teachings of the present application is described with particular reference to the presently preferred embodiments, wherein these innovative teachings are advantageously applied to the particular problems of a programmable agent workstation system and method. However, it should be understood that these embodiments are only examples of the many advantageous uses of the innovative teachings herein. In general, statements made in the specification of the present application do not necessarily limit any of the various claimed inventions. Moreover, some statements may apply to some inventive features but not to others. In general, unless otherwise indicated, singular elements may be in the plural and visa versa with no loss of generality.

Definitions

Throughout the discussion in this document the following definitions is utilized:

System Blocks/Procedural Steps Not Limitive

The present invention may be aptly described in terms of exemplary system block diagrams and procedural flowcharts. While these items are sufficient to instruct one of ordinary skill in the art the teachings of the present invention, they should not be strictly construed as limiting the scope of the present invention. One skilled in the art is aware that system block diagrams may be combined and rearranged with no loss of generality, and procedural steps may be added or subtracted, and rearranged in order to achieve the same effect with no loss of teaching generality. Thus, it should be understood that the present invention as depicted in the attached exemplary system block diagrams and procedural flowcharts is for teaching purposes only and may be reworked by one skilled in the art depending on the intended target application.

Personal Computer Not Limitive

Throughout the discussion herein there is examples provided that utilize personal computer (PC) technologies to illustrate the teachings of the present invention. The term 'personal computer' should be given a broad meaning in this regard, as in general any computing device may be utilized to implement the teachings of the present invention, and the scope of the invention is not limited just to personal computer applications.

Operating System Not Limitive

Additionally, while the present invention may be implemented to advantage using a variety of Microsoft® operating systems (including a variety of Windows™ variants), nothing should be construed to limit the scope of the invention to these particular software components. In particular, the system and method as taught herein may be widely implemented in a variety of systems, some of which may incorporate a graphical user interface.

System

Overview

Figure 3:
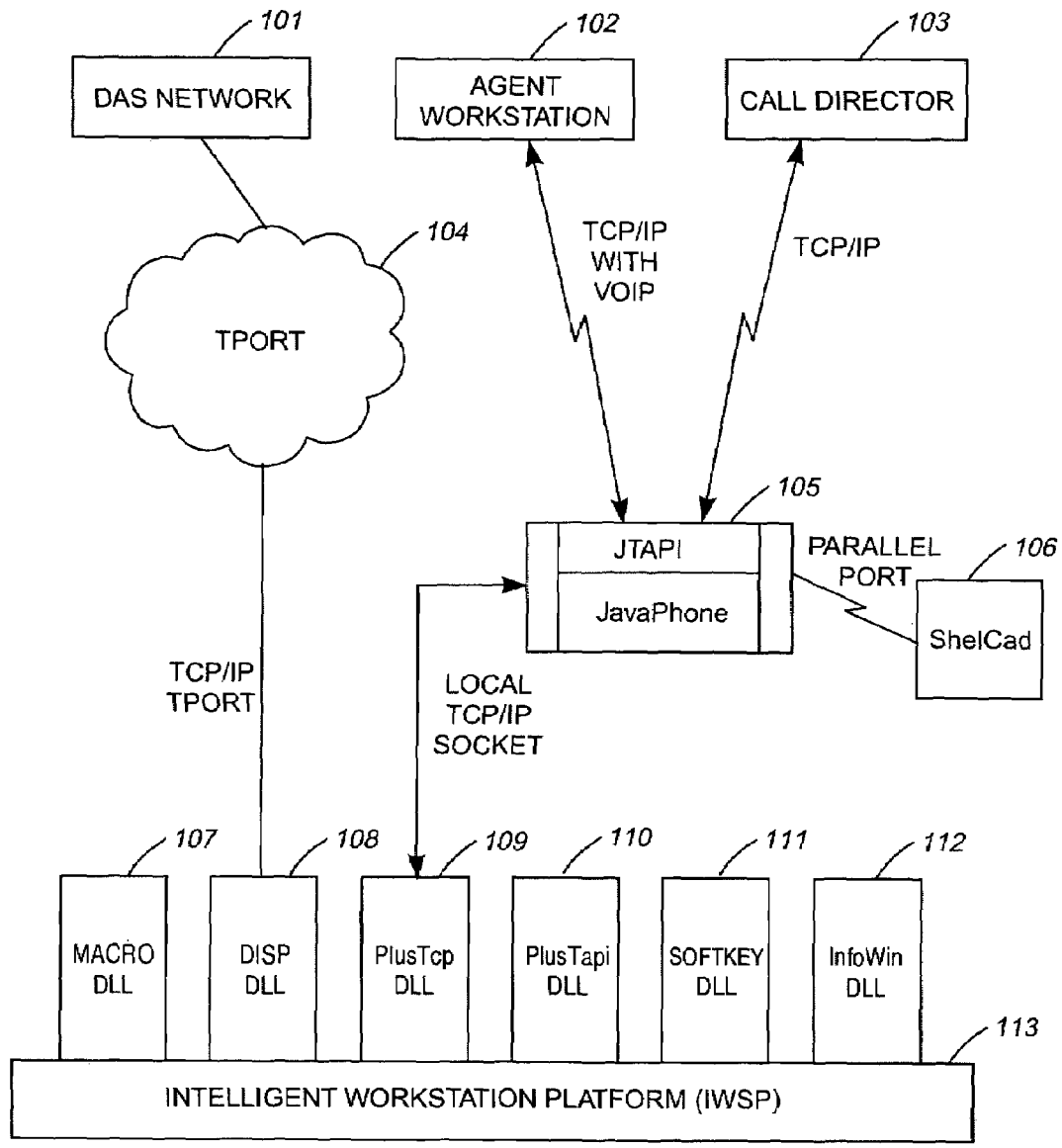
FIG. 3 illustrates a generalized system block diagram showing major components of the present invention.

The present invention generally can be viewed in terms of the exemplary system architecture illustrated in FIG. 3. This exemplary architecture will now be described in detail.

The following discussion details the functional specification and other elements necessary for Directory Assistance (DAS) workstations to support a proposed Network Call Center. FIG. 3 illustrates a high-level representation of the proposed system architecture. There are several enhancements to the Directory Assistance System environment in the proposed Network Call Center, including:

1. The transmission of voice data over the TCP/IP network instead of dedicated audio lines.
2. Usage of a standard PC with a serial-port attached headset unit for the audio signals.
3. Elimination of the usual call center switch and the Call Processing Gateway Workstation Functional Specifications for the Network Call Center.

All of the switch related controls, such as "make busy", along with the audio signal, is sent over the TCP/IP network to the "JavaPhone" application (105, 4400) residing on the workstation. The workstation generally provides a panel that contains visual indicators to the operator of the current call and audio states. This panel is referred to in this document as the "Call Status Window" (CSW).

Assumptions

The following design points and assumptions have been identified for the DISP/IWSP workstation:

1. TPORT continues to support all existing messaging between the workstation and the existing components in the DAS network (e.g., LSIP, MAP, etc.).
2. All of the Call Control messages (call arrival, disconnect, etc.) are sent and received through the JavaPhone API. The Call Processing Gateway (CPG) are not be utilized.
3. Voice may be transmitted to the workstation using "Voice Over Data" (VoD) technology.
4. The "JavaPhone" provides the audio support within the workstation, utilizing the ShelCad external component (attached to the PC via the serial port).
5. Supervisor monitoring of an operator may not include the capability to listen to the operator's audio signal.
6. The workstation must include support for any audio-related controls (e.g., Volume Up/Down, Microphone Mute, etc.).
7. The workstation provides new support for all switch-related messaging to the newly developed "Call Director" component (e.g., Make Busy, etc.).
8. The workstation must provide some sort of "switch and audio state display" to the operator containing information such as call status, muted microphone, position made busy, etc.
9. Basic DA functionality in the DISP/IWSP workstation is supported.
10. Voice Store and Forward and Speech Recognition technology is not included.
11. The workstation runs as a 16-bit application on the Windows™ 95 platform, but is not limited to this application.

EXEMPLARY WORKSTATION DESIGN

The following sections describe the implementations for each of the identified features required for the Network Call Center. The workstation may continue to be implemented as a 16-bit Windows™ application but can also execute in a Windows™ 95 environment. Additional workstation components is required for the new features. FIG. 3 illustrates a sample pictorial representation of the exemplary DA workstation software components.

The new components are shown in FIG. 3 with bold lines and bold blue lettering and include:
1. JavaPhone Application (105, 4400);
2. "PlusTcp DLL" (109, 5500); and
3. "PlusTapi DLL" (110, 6600).

The existing components that will require modifications are shown in bold lines with normal black lettering and include a DISP DLL (Directory Assistance client application). The following sections will describe each of these discrete components as well as identify other implementation requirements for the Network Call Center.

JavaPhone Application (FIG. 4) (105, 4400)

Figure 4:
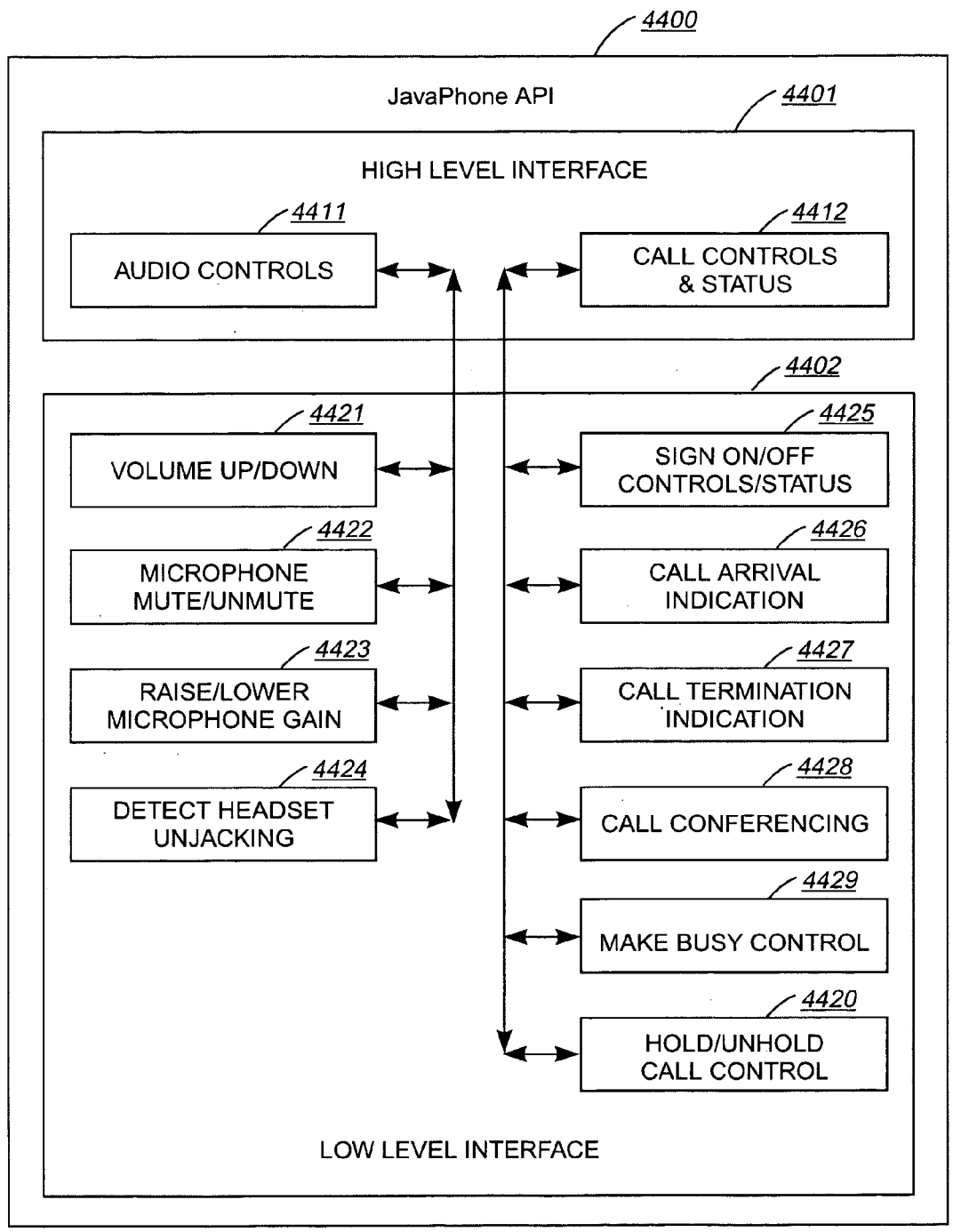
FIG. 4 illustrates an exemplary JavaPhone API interface used in some embodiments of the present invention.

The JavaPhone application (105, 4400) as illustrated in FIG. 3 (105) and FIG. 4 (4400) provides two basic functions:
1. audio controls and status (4411); and
2. call controls and status (4412).

The JavaPhone application (105, 4400) supports a local TCP/IP socket interface that will allow the workstation software (DISP/IWSP) to perform the various operations available and to receive any status events or attributes. A single local TCP/IP socket is used for communicating both audio and call controls.

JavaPhone Audio Controls (4401)

The audio path will involve sending "Voice over Data" (VoD) using the H.323 protocol. The operator will utilize a headset that is connected either to the ShelCad product (external to the PC hardware). The JavaPhone application (105, 4400) will transmit and receive the audio data through a TCP/IP socket connection to the "VoD Gateway".

The following audio features may be implemented in this functional block:
1. Volume Up/Down controls (4421);
2. Microphone Mute/Unmute controls (4422);
3. Raise/Lower Microphone gain controls (4423); and
4. Detection of headset unjacking (4424).

JavaPhone Call Controls (4412)

The call controls is transmitted and received between the JavaPhone application (105, 4400) and the Call Director using the Java Telephony API (JTAPI). The following call controls and status events are generally available in the present invention:

1. Sign On/Sign Off controls and status events (4425);
2. Call arrival indications (4426);
3. Call termination indications (4427);
4. Call Conferencing (4428);
5. Make Busy control (4429); and
6. Hold/Unhold call control (4420).

The TCP/IP messaging API provides all of the audio and call controls sent across the local socket connection.

PlusTcp DLL (FIG. 5) (109, 5500)

The PlusTcp DLL (109, 5500) will receive data into the buffers provided by the calling application (in this case, the PlusTapi DLL (110, 6600)). Consequently, there is no need for the PlusTcp DLL (109, 5500) to internally buffer messages received from any of the open sockets.

PlusTcp Enumerated Commands (5502)

Figure 5:
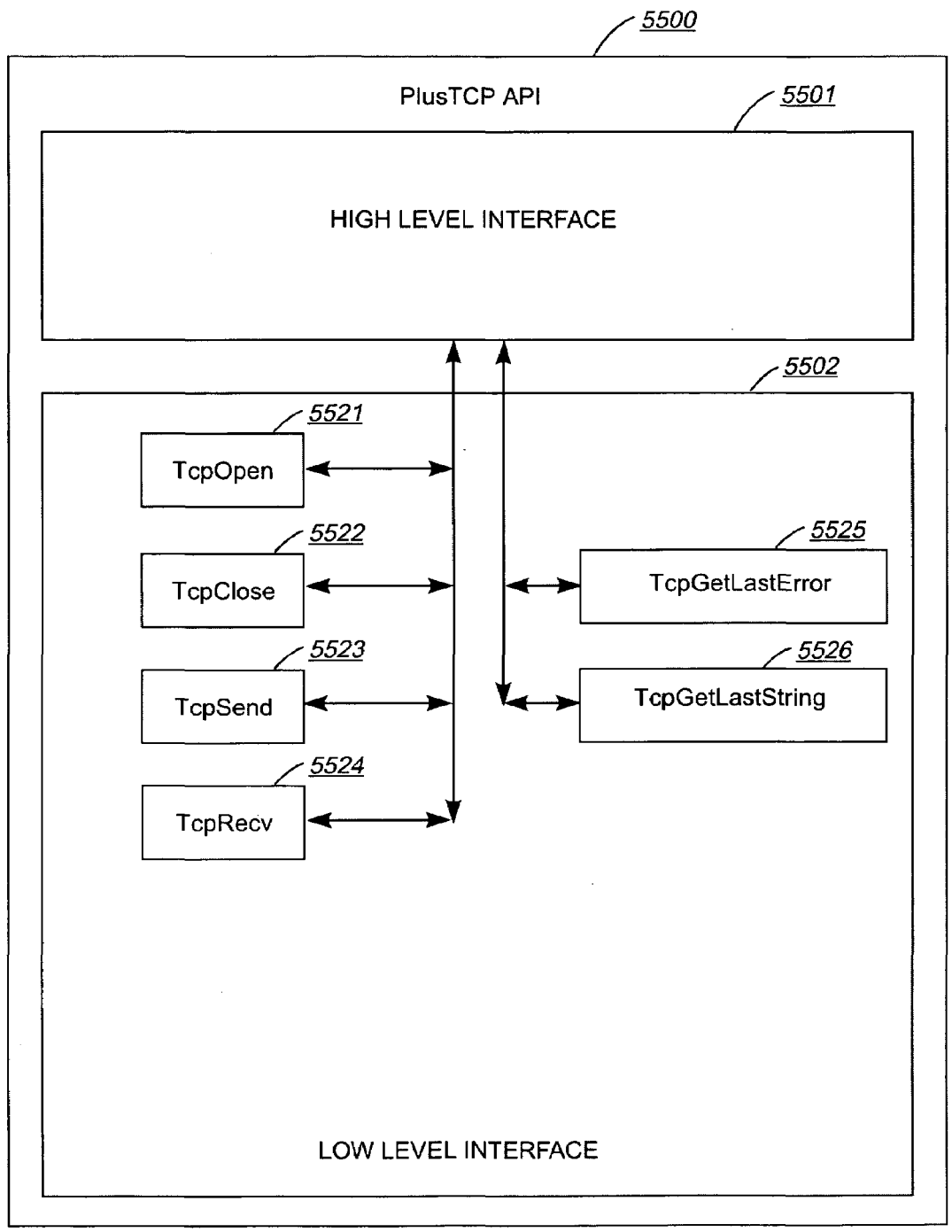
FIG. 5 illustrates an exemplary PlusTCP API interface used in some embodiments of the present invention.

As illustrated in FIG. 5, this new IWSP DLL provide the following commands:
1. TcpOpen (5521)—this command will establish the socket connection with the TCP/IP address and port number provided.
2. TcpClose (5522)—this command will terminate the socket connection
3. TcpSend (5523)—this command will send data over the previously established socket connection.
4. TcpRecv (5524)—this command will receive data from the previously established socket connection.
5. TcpGetLastError (5525)—this command will retrieve the most recent error for the requested conversation (i.e. —socket).
6. TcpGetError String (5526)—this command will return a message string that contains the textual description of the error return code obtained through the TcpGetLastError command.

The above commands support the basic TCP/IP messaging needed for any IWSP DLL communicating with another application residing either on the same PC (as in the case of the JavaPhone application) or elsewhere in the TCP/IP network. Each command specifies a "conversation" number that the PlusTcp DLL (109, 5500) can send and receive data on the proper socket.

The PlusTcp DLL (109, 5500) supports an advisement scheme that is used for notifying the associated client (in this case, the PlusTapi DLL (110, 6600)) that data is available. The using IWSP DLL enumerates a non-persistent variable that is used for invoking a callback routine whenever data is received on an open socket. This non-persistent enumerated variable must be declared to the IWSP platform and then specified as a parameter in the TcpOpen command (see below). When the PlusTcp DLL (109, 5500) is notified through the WINSOCK DLL API that data is available on an open socket, the PlusTcp DLL (109, 5500) will invoke the IWSP's PlusPokeData command, specifying the enumerated non-persistent variable provided on the TcpOpen command. The IWSP platform will then detect that the enumerated variable is non-persistent and invoke the specified callback routine (in this case, the routine in the PlusTapi DLL (110, 6600)). The owning DLL (i.e.—PlusTapi) should then pust itself a WindowsT™ "WM_USER" message to indicate to itself that it needs to read from the socket. It should not perform the TCP/IP receive on the same thread of execution of the callback routine. When the owning DLL later receives its WM USER message, it must then invoke the TcpRecv command (enumerated by the PlusTcp DLL) to read the data from the TCP/IP socket. Note that due to the nature of the TCP/IP socket data stream, a single TcpRecv operation can return more than one message from the JavaPhone application.

The PlusTcp DLL (109, 5500) is designed to support up to eight (8) socket connections for usage by one or more IWSP DLLs. Each session is identified with a "conversation number" that is specified as the first parameter in each of the PlusTcp DLL (109, 5500) enumerated commands. The PlusTcp DLL (109, 5500) maintains and enumerate to IWSP the internal variables containing any errors received during the last TCP/IP API call, thereby allowing the client applications to obtain this information.

TcpOpen Command (5521)

This command is invoked whenever an IWSP DLL wishes to open a TCP/IP socket to another application that is acting as a TCP/IP server. An advisement variable is specified in the parameter list that would be subsequently invoked whenever data is received on the socket.

| Format: | TcpOpen (nConv, sInetAddress, nPortNumber, sAdviseVar) | |
|---|---|---|
| Para-meters: | Nconv | "Conversation number". The PlusTcp DLL supports up to 8 different sessions. Each session can have one active socket. Valid values are 1–8. |
| | sInetAddress | TCP/IP address of the server system (e.g., 9.83.85.218 or "LocalHost" |
| | nPortNumber | Port number of the server system (e.g. - 23) |
| | sAdviseVar | This should be a "non-persistent" enumerated variable declared to IWSP. The callback routine specified in this enumerated variable is called whenever data is received on the active socket. |
| Returns: | PLUS_COMMAND_OK | Socket opened successfully |
| | PLUS_COMMAND_NOT_AVAIL | PlusTcp DLL not installed. |
| | PLUS_COMMAND_ERROR | General failure occurred. |
| | −100 | Invalid parameters passed. |
| | −101 | Invalid conversation number. |
| | −102 | Requested conversation number already in use. |

TcpClose Command (5522)

This command is invoked whenever an IWSP DLL wishes to close a previously opened TCP/IP connection.

| Format: | TcpClose (nConv) | |
|---|---|---|
| Parameters: | Nconv | "Conversation number", previously initialized with an invocation of the TcpOpen command. |
| Returns: | PLUS_COMMAND_OK | Socket successfully closed. |
| | PLUS_COMMAND_NOT_AVAIL | PlusTcp DLL not installed. |
| | PLUS_COMMAND_ERROR | General failure occurred. The IWSP DLL should invoke the |

-continued

| | | TcpGetLastError command to obtain the TCP/IP failure indication. |
|---|---|---|

TcpSend Command (5523)

This command is invoked whenever an IWSP DLL wishes to write data to a TCP/IP socket previously established with the TcpOpen command.

| Format: | TcpSend (nConv, sDataName, nOfset,nLength) | |
|---|---|---|
| Parameters: | Nconv | "Conversation number", previously initialized with an-invocation of the T en command. |
| | SDataName | Enumerated variable name that contains the data to be written to the socket. |
| | Noffset | Offset into the sDataName buffer that the data is to be written from. |
| | Nlength | Length of the data to be written. |
| Returns: | PLUS_COMMAND_OK | Command executed successfully. |
| | PLUS_COMMAND_NOT_AVAIL | PlusTcp DLL not installed. |
| | PLUS_COMMAND_ERROR | General failure occurred. The IWSP DLL should invoke the TcpGetLastError command to obtain the TCP/IP failure indication. |

TcpRecv Command (5524)

This command is invoked whenever an IWSP DLL wishes to read data from a TCP/IP socket previously established with the TcpOpen command. Note that TCP/IP data is received as a data stream, which implies that the buffer could contain more than one application message in it. It is the responsibility of the receiving application to parse through the data, decoding its contents.

Note: This command does not block on the read of the TCP/IP socket. If no data is available, it will return immediately to the caller with a return code of 0.

| Format: | TcpRecv (nConv, sDataName, nOffset, nLength) | |
|---|---|---|
| Parameters: | Nconv | initialized with an invocation of the TcpOpen command. |
| | SDataName | Enumerated variable name that is to contain the data read from the socket. |
| | Noffset | Offset into the sDataName buffer that the data is to be read into. |
| | Nlength | Maximum length of the data to be read. |
| Returns: | 0 | No data available. |
| | >0 | Length of data read from socket. |
| | PLUS_COMMAND_NOT_AVAIL | PlusTcp DLL not installed. |
| | PLUS_COMMAND_ERROR | General failure occurred. The IWSP DLL should invoke the TcpGetLastError command to obtain the TCP/IP failure indication. |

TcpGetLastError Command (5525)

This command is invoked whenever an IWSP DLL wishes to obtain the specific error indication that occurred during the invocation of one of the other available PlusTcp DLL (109, 5500) commands (see above).

| Format: | TcpGetLastError (nConv sDataName) | |
|---|---|---|
| Parameters: | NConv | "Conversation number", previously initialized with an invocation of the TcpOpen command. |
| | SDataName | Enumerated variable name that is loaded with the last TCP/IP return code. This variable should be an unsigned short data type. |
| Returns: | PLUS_COMMAND_OK | Command executed successfully. |
| | PLUS_COMMAND_NOT_AVAIL | PlusTcp DLL not installed. |
| | PLUS_COMMAND_ERROR | General failure occurred. |

TcpGetError String (5526)

This command will return a message string that contains the textual description corresponding to the error return code obtained through the TcpGetLastError command.

| Format: | TcpGetErrorString (nErrNum, sDataName,nMaxBytes) | |
|---|---|---|
| Parameters: | NerrNum | Error number returned through usage of the TcpGetLastErr command. |
| | SdataName | Data item name that is loaded with the string corresponding to the nErrNum parameter |
| | NmaxBytes | Maximum number of bytes, including the Null terminator, that are to be copied into the sDataName variable. |
| Returns: | PLUS_COMMAND_OK | Command executed successfully. |
| | PLUS_COMMAND_NOT_AVAIL | PlusTcp DLL not installed. |
| | PLUS_COMMAND_ERROR | General failure occurred. |
| | −103 | Invalid Error number. |

Error Handling

The PlusTcp DLL (109, 5500) will always return a negative numeric (PLUS_COMMAND_ERROR) return code through the IWSP DLL API whenever one of its calls to the Winsock API produces an error. This will allow the calling DLL (in this case, PlusTapi) to choose to deal with the error either programmatically or by generating an error message to the operator. When an error with the Winsock API is detected during the handling of a TcpSend, TcpRecv, or TcpClose command, PlusTcp will store the return code of the specific failure in its internal variable accessible through the TcpGetLastError command. The calling DLL will receive only the PLUS_COMMAND_ERROR return code through the IWSP DLL API. It should then perform the TcpGetLastError command, specifying the appropriate conversation number, to obtain the specific error code. The calling DLL can then optionally call the TcpGetError String to obtain an error message string (from the currently selected language file) that matches the error number obtained through the TcpGetLastError call. Since the PlusTcp enumerates a message string for each of the possible error conditions, the calling DLLs do not need to enumerate equivalent strings. The customer can alter the textual content of these strings through usage of the IWSP Define Language utility. Note that the TcpOpen command does return more specific return codes since these failures would be occurring before a TCP/IP conversation could be established with the Winsock DLL.

If an unexpected TCP/IP error occurs which results in the termination of an active session, the PlusTcp DLL (109, 5500) will not attempt to perform any retries to reestablish the session. Subsequent command invocations on the affected conversation (socket) will generate error status in response. The calling DLL can then report the error through the man-machine interface.

Figure 6:
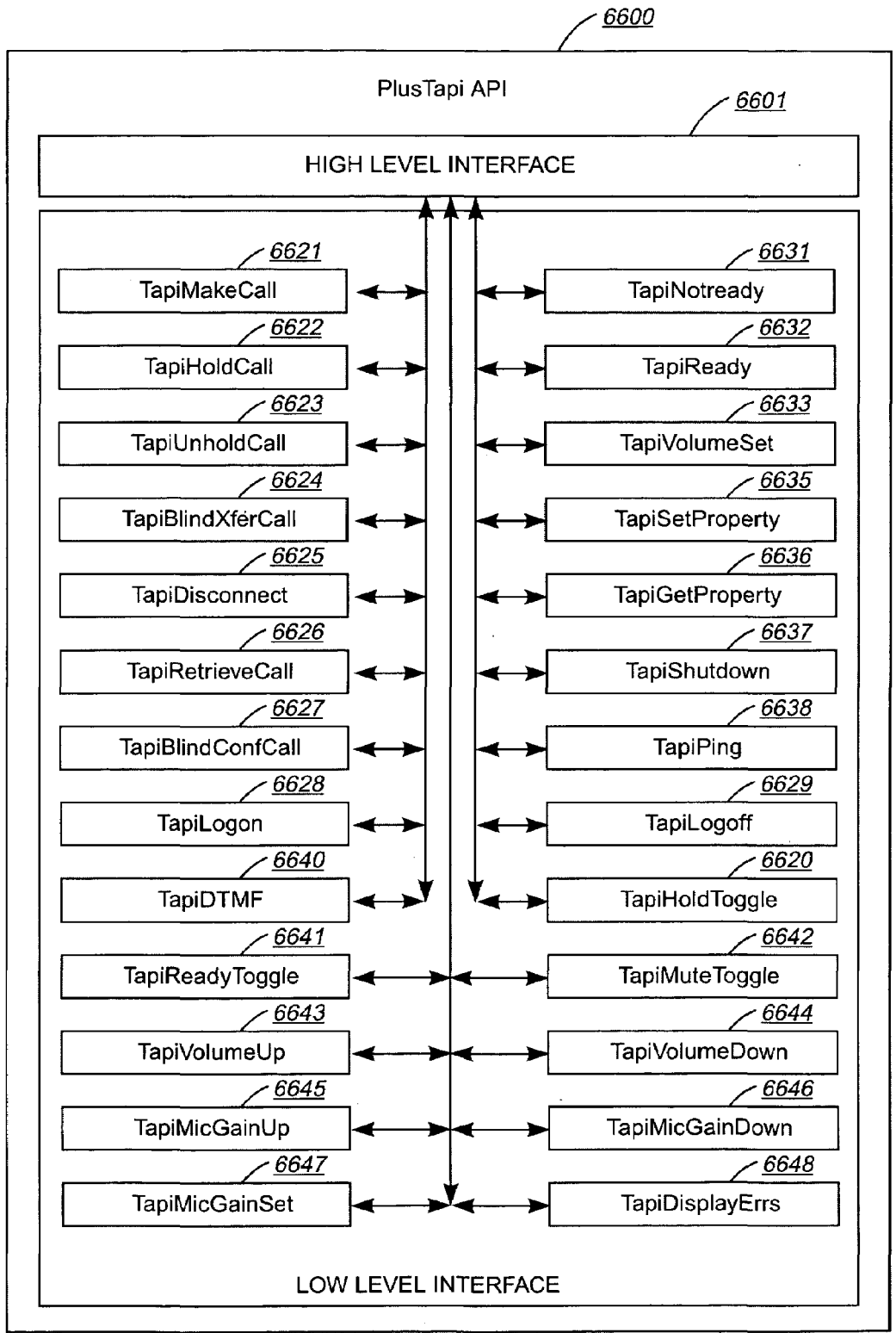
FIG. 6 illustrates an exemplary PlusTapi API interface used in some embodiments of the present invention.

PlusTapi DLL (FIG. 6) (110, 6600)

The PlusTapi DLL enumerates the commands and data items to the IWSP platform that will allow a DA operator to communicate with the JavaPhone application (105, 4400) and perform the related audio and call control operations. The PlusTapi DLL (110, 6600) enumerated commands support usage of IWSP Softkeys or DISP Macro Keys for invoking the operations that will perform the required messaging to the JavaPhone application. The PlusTapi DLL (110, 6600) utilize the PlusTcp DLL (109, 5500) to send and receive the TCP/IP messaging to and from the JavaPhone application.

The PlusTapi DLL (110, 6600) also provides visual status indicators to the operator (such as for Microphone Muted). This is accomplished through textual displays on the existing "InfoWin DLL".

The PlusTapi DLL (110, 6600) utilizes the PlusTcp DLL (109, 5500) command (TcpOpen) to establish a local socket connection to the JavaPhone application (105, 4400) during startup. Retry logic is provided to handle any startup synchronization of the two applications.

The PlusTapi interface with the JavaPhone application (105, 4400) is handled independently from the existing DISP-CPG interface. All messaging related to call processing is sent and received through the JavaPhone API. When the PlusTapi DLL (110, 6600) receives an indication of a call arrival from the JavaPhone, it will instruct DISP to simulate a start of call by invoking the PosNewCall command. Similarly, when the PlusTapi DLL (110, 6600) receives from the JavaPhone the indication that the call has terminated, it will instruct DISP to simulate an end of call by invoking the PosCallRelease command. These commands will allow DISP to track rudimentary operator statistics. Call completion is offered, which is accomplished by performing a "blind conference" operation through the JavaPhone API. When the call completion operation is successful, the Call Director is instructed to remove the call from the operator position. At that point, the JavaPhone, and subsequently PlusTapi, will receive a CallRemoved message. PlusTapi would perform the appropriate advisement on the "macro event", allowing for the update of the Call Status Window.

With each message that PlusTapi sends to the JavaPhone application, it will receive a corresponding response indicating the success or failure of the request. These responses are directly generated by the component that is actually performing the requested operation. For example, if PlusTapi sends the AgentNotReady message to the JavaPhone application, the request will flow up to the "Call Director Custom Server" and then to the "Virtual ACD" before returning back down to the JavaPhone application (105, 4400) and then onto PlusTapi. When the response is received, PlusTapi will trigger any events that are associated with the request. In the "agent not ready" example, the "TapiEventNotReady" macro advisement event would be triggered, most likely resulting in textual display change on the InfoWin DLL for the operator's visual confirmation of the request. The fact that responses are directly generated by the owning system component will guarantee that the visual display to the operator accurately reflects the resulting success or failure of the request (as opposed to JavaPhone generating immediate successful responses indicating that the request has only been forwarded on to the appropriate system component).

PlusTapi will receive a CallCreated message and a CallRemoved message with each call received at the workstation. This will apply regardless of how the call was initiated or terminated.

The PlusTapi DLL (110, 6600) enumerates all of the commands required for handling both the audio and call control interfaces as defined by the JavaPhone application. These include:
1. TapiMakeCall (6621);
2. TapiHoldCall (6622);
3. TapiUnholdCall (6623);
4. TapiBlindXferCall (6624);
5. TapiDisconnect (6625);
6. TapiBlindConfCall (6626);
7. TapiRetrieveCall (6627);
8. TapiLogon (6628);
9. TapiLogoff (6629);
10. TapiNotReady (6631);
11. TapiReady (6632);
12. TapiSetVolume (6633);
13. TapiMicGainSet (6647);
14. TapiSetProperty (6635);
15. TapiGetProperty (6636);
16. TapiShutDown (6637);
17. TapiPing (6638);

The PlusTapi DLL (110, 6600) also enumerates the following additional commands that to facilitate the usage of the JavaPhone APIs in an DA operator environment:
1. TapiReadyToggle (6641);
2. TapiMuteToggle (6642);
3. TapiVolumeUp (6643);
4. TapiVolumeDown (6644);
5. TapiMicGainUp (6645);
6. TapiMicGainDown (6646);

Refer to the section, PlusTapi Enumerated Commands for additional information.

The PlusTapi DLL (110, 6600) will display any detected errors using standard Windows™ controls (Dialog Boxes, Messageboxes, etc.) so as to not tie usage of the PlusTapi DLL (110, 6600) with the DISP DLL. In other words, DISP should not be a prerequisite to usage of PlusTapi. This design point implies that although the PlusTapi enumerated commands will generate numeric return codes to the calling DLL or macro, PlusTapi will automatically generate a Windows™ Messagebox containing any error messages to the operator. In the future this could be changed so that PlusTapi would rely on the invoking DLL to either generate an error message or handle the failure programmatically.

PlusTapi Startup

During startup, the PlusTapi DLL (110, 6600) must perform the required initialization sequence with the JavaPhone application. In order to communicate with the JavaPhone application, the PlusTapi DLL (110, 6600) must first establish a TCP/IP socket connection by invoking the PlusTcp DLL's TcpOpen command with the appropriate parameters. The TCP/IP address is configured using the initialization command enumerated by the PlusTapi DLL (110, 6600). This TCP/IP address will either be the specific value assigned to the PC that the JavaPhone software is installed on or the string, "localhost" that will indicate that the JavaPhone is running on the same PC. The PlusTapi DLL (110, 6600) will request the "conversation number" in the TcpOpen command that is specified with the utility mode setting (see the section PlusTapi Utility Mode). Retry logic is included for establishing the initial socket connection. If PlusTapi failed to establish a socket connection with the JavaPhone application, none of the PlusTapi macro events would have been triggered, resulting in the Call Status Window not having any call-related icons displayed.

After the initialization sequence with the JavaPhone is completed, the PlusTapi DLL (110, 6600) will request a "DUX Advisement" on the DISP sign on operation. This will result in PlusTapi being notified whenever the operator performs a successful sign on operation. See the next section for additional information about operator sign on.

Note: The remainder of the JavaPhone initialization sequence, including the opening of the connections to the Call Director and VoD Gateway is not initiated until the time of the operator sign on sequence.

At the completion of its startup logic, the PlusTapi DLL (110, 6600) must be prepared to accept any incoming calls. This is accomplished through usage of a "callback" routine. This callback routine is identified in the enumerated non-persistent variable, (TapiReadAvail) is specified in the TcpOpen command. See the section Inbound Call Processing for additional information.

Figure 7:
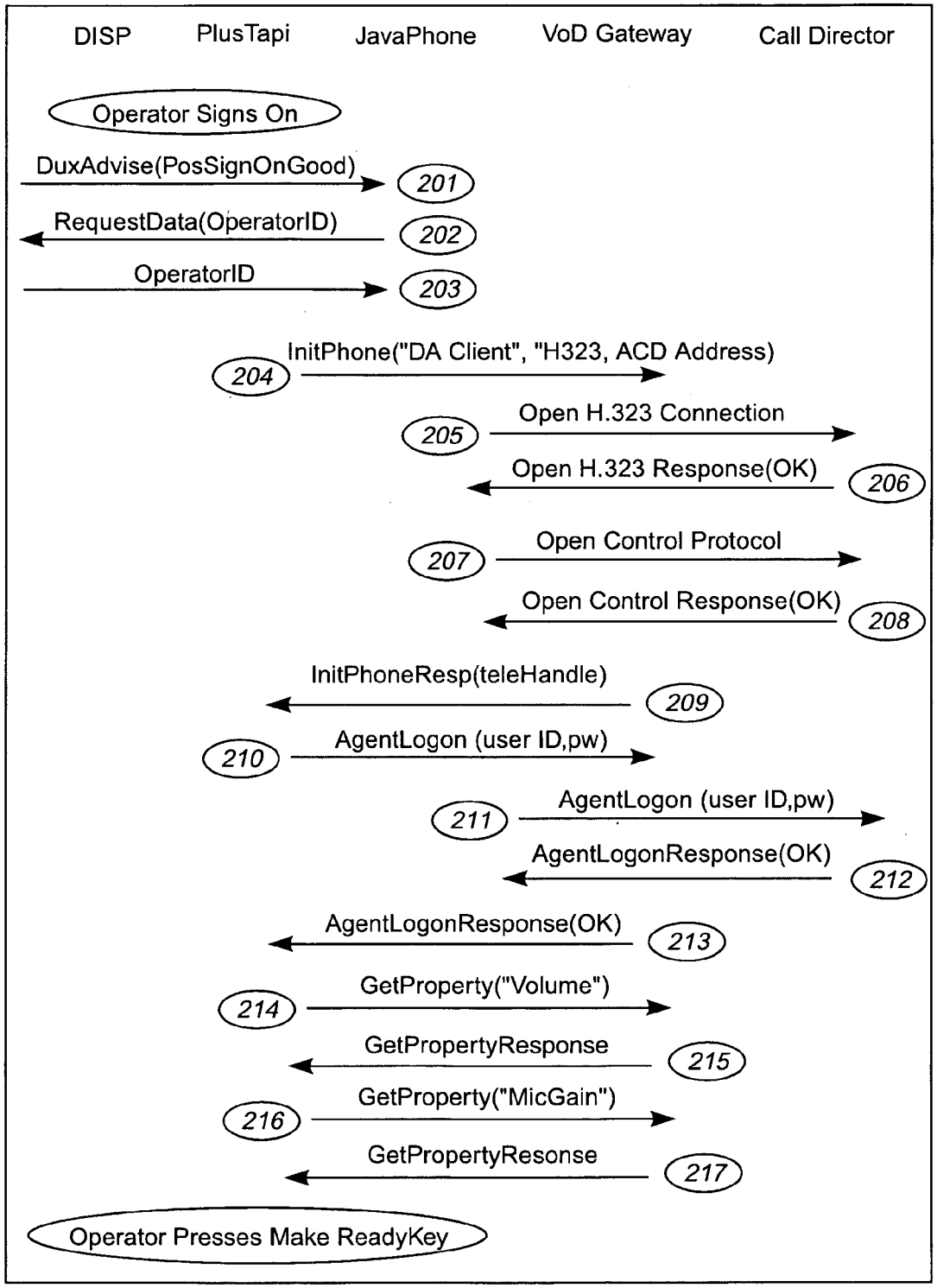
FIG. 7 illustrates an exemplary normal sign on message sequence data flow used in some embodiments of the present invention.

Operator Sign on (FIG. 7)

PlusTapi relies on the operator's invocation of the existing DISP sign on operation as a means of obtaining the operator's ID (i.e. —user ID) for usage in the logon to the Call Director. The workstation is configured to enable the password validation feature of the MAP. An operator will invoke the DISP sign on panel and enter a valid operator ID and password. Once the sign on validation is completed, DISP will execute a "DUX Advisement" that will in turn notify PlusTapi that the sign on has occurred.

Once the operator sign on notification is received, the PlusTapi DLL (110, 6600) will invoke the InitPhone command to initialize the telephony environment with the JavaPhone application (105, 4400) and provide the address of the "Virtual ACD". The response to this message will provide a "telephone handle" that must be used in all subsequent operations with the JavaPhone application (105, 4400) so that the telephone toolkit can distinguish between different clients.

If the InitPhone request fails, PlusTapi will enter into a retry sequence that is controlled by the corresponding utility mode parameter setting (see PlusTapi Utility Mode). PlusTapi will reissue the InitPhone message for the specified duration, pausing one second between each attempt. If all retries fail, PlusTapi will also close the previously opened TCP/IP socket with the JavaPhone application (105, 4400) and then display an error Messagebox to the operator. The retry sequence is reinitiated whenever a logon sequence is attempted.

When the response is received for the InitPhone message to the JavaPhone application, PlusTapi will perform one of two possible macro advisements:

1. TapiEventActive—the telephony environment is established and ready to handle calls;

2. TapiEventInactive—the telephony environment is inactive (due to the occurrence of an error).

These macro callback events allow the customer to update the Call Status Window with textual data indicating the status of the operator position.

Should one of both of the connections between the JavaPhone and either the Call Director Custom Server or the VoD Gateway be lost at any time subsequent to the startup sequence, the ConnectionStatusChanged message is sent by the JavaPhone application (105, 4400) to PlusTapi. PlusTapi will then perform any requested advisements on either the TapiEventActive or TapiEventInactive events. PlusTapi will next attempt to reestablish the connections by utilizing its retry logic as described in the preceding paragraph. If the connections are reestablished, PlusTapi will attempt to relogon the operator (assuming one was logged on during the failure). If all retries to establish the connections fail, PlusTapi will close the previously opened TCP/IP socket with the JavaPhone application (105, 4400) and then display an error Messagebox to the operator. The retry sequence is reinitiated whenever a logon sequence is subsequently attempted.

Once the JavaPhone is successfully initialized with the InitPhone message, PlusTapi will request two of the JavaPhone's internal properties:

1. The current headset volume setting (0–100)
2. The current microphone gain setting (0–100)

These two values are stored in PlusTapi global (static) variables since they is required in any subsequent processing of the associated commands used for increasing or decreasing these settings. These values will also be available as enumerated variables, TapiVolumeLevel and TapiMicGainLevel.

PlusTapi will next attempt to execute the "CalActive" command to determine if Common Logon is in effect (the CAL DLL is installed). If so, PlusTapi should inhibit usage of the TapiLogon command (accessed through the IWSP "DllCommandExecute" entry point), thereby forcing an operator to utilize the CAL Common Logon in order to handle DA calls. If the CAL DLL is not installed (i.e.—the "CalActive" command fails), PlusTapi should set an internal state flag indicating that Common Logon is not in effect.

PlusTapi will then invoke the AgentLogon command of the JavaPhone application. PlusTapi will use the existing DISP API to obtain the operator ID that was used for the sign on. The JavaPhone application (105, 4400) will perform the necessary messaging with the Call Director and eventually respond with the AgentLogon response message to PlusTapi. The AgentLogon response will contain the logon status and, if successful, the "Agent ID". This Agent ID must be saved by PlusTapi for usage in other commands subsequently issued to the JavaPhone application.

If the status received in the AgentLogon response indicates a failure, PlusTapi will generate a standard Windows™ Messagebox to display the appropriate error message to the operator.

After the operator successfully logs on, the position will initially be placed in the "not ready" state. The operator must toggle to the "ready" state before the first call can be received from the Call Director.

FIG. 7 illustrates an exemplary normal operator sign on message sequence.

Figure 8:
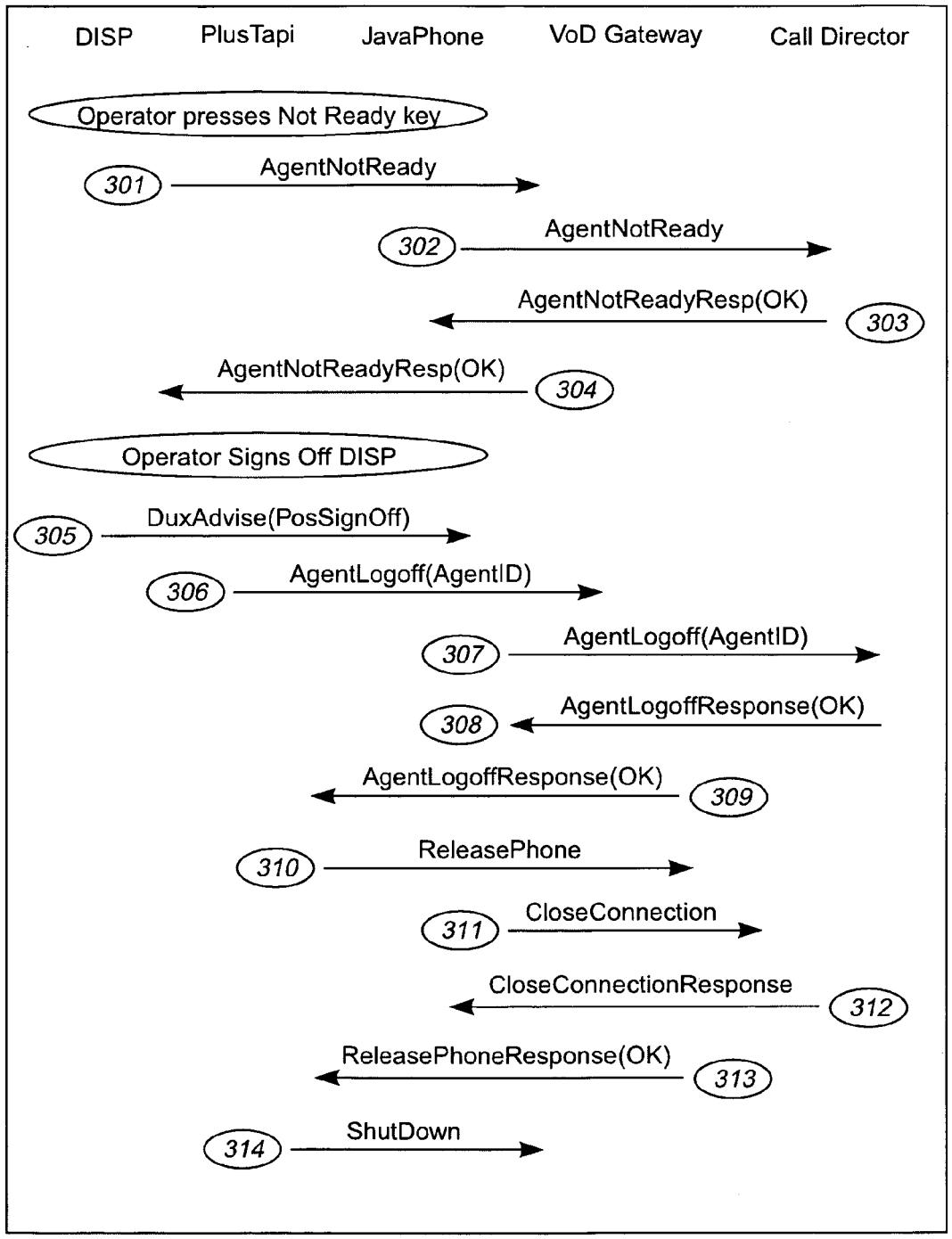
FIG. 8 illustrates an exemplary normal sign off message sequence data flow used in some embodiments of the present invention.

Operator Sign Off (FIG. 8)

When PlusTapi receives a sign off notification from DISP, it will issue the AgentLogoff command to the JavaPhone application. In order for a logoff to be initiated to the Call Director, the following two conditions will apply:
1. The operator (agent) must be in the Not Ready state
2. There must not be a call active If either of the two conditions is not met, PlusTapi will receive an AgentLogoff response with error status. PlusTapi will subsequently generate a standard Windows™ Messagebox to display the appropriate error message to the operator. The Logoff operation will then be blocked until the operator performs corrective action. Note that if a call is active, DISP should prevent the operator from performing a sign off operation.

FIG. 8 illustrates an exemplary sign off message sequence that would occur when the operator first presses the Not Ready" key, followed by the "Sign Off" key. Note: Once the operator sign off sequence is completed, the JavaPhone application (105, 4400) will have terminated its connections with the VoD Gateway and Call Director.

Figure 9:
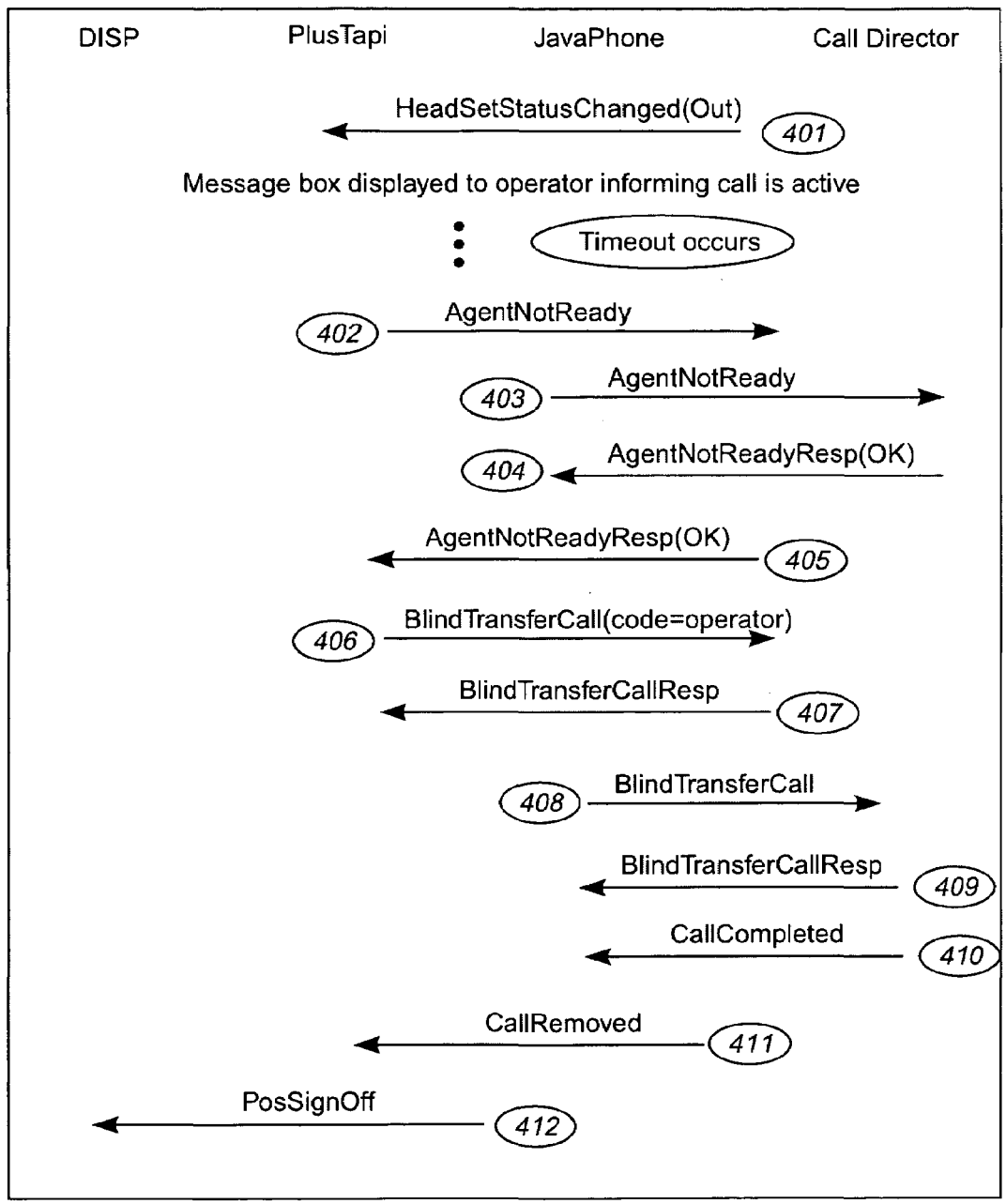
FIG. 9 illustrates an exemplary headset unjack logoff message sequence data flow used in some embodiments of the present invention.

Operator Headset (FIG. 9)

The JavaPhone application (105, 4400) apprises the PlusTapi DLL (110, 6600) of any change in status of the operator headset (plugged or unplugged) by sending the HeadSetStatusChanged message. Whenever this message is received from the JavaPhone application, PlusTapi will update its enumerated variable, TapiHeadSetStatus.

When the PlusTapi DLL (110, 6600) is notified by the JavaPhone application (105, 4400) that the headset has been unjacked, it will first check to assure that a call is not active and then request DISP to perform a sign off operation by invoking the PosSignOff command. If a call is active when the headset is unjacked, PlusTapi will display an error message to the operator in a standard Windows™ Message box and then start a timer to allow the operator sufficient time to jack the headset back in. The length of this timeout is configured with the PlusTapi utility mode. If the timer expires before the headset is plugged back in, PlusTapi will initiate the appropriate messaging to the JavaPhone to request that the active call be transferred to another operator.

Should an operator unjack the headset and walk away while a call is active, the exemplary message sequence in illustrated in FIG. 9 is generated.

Figure 10:
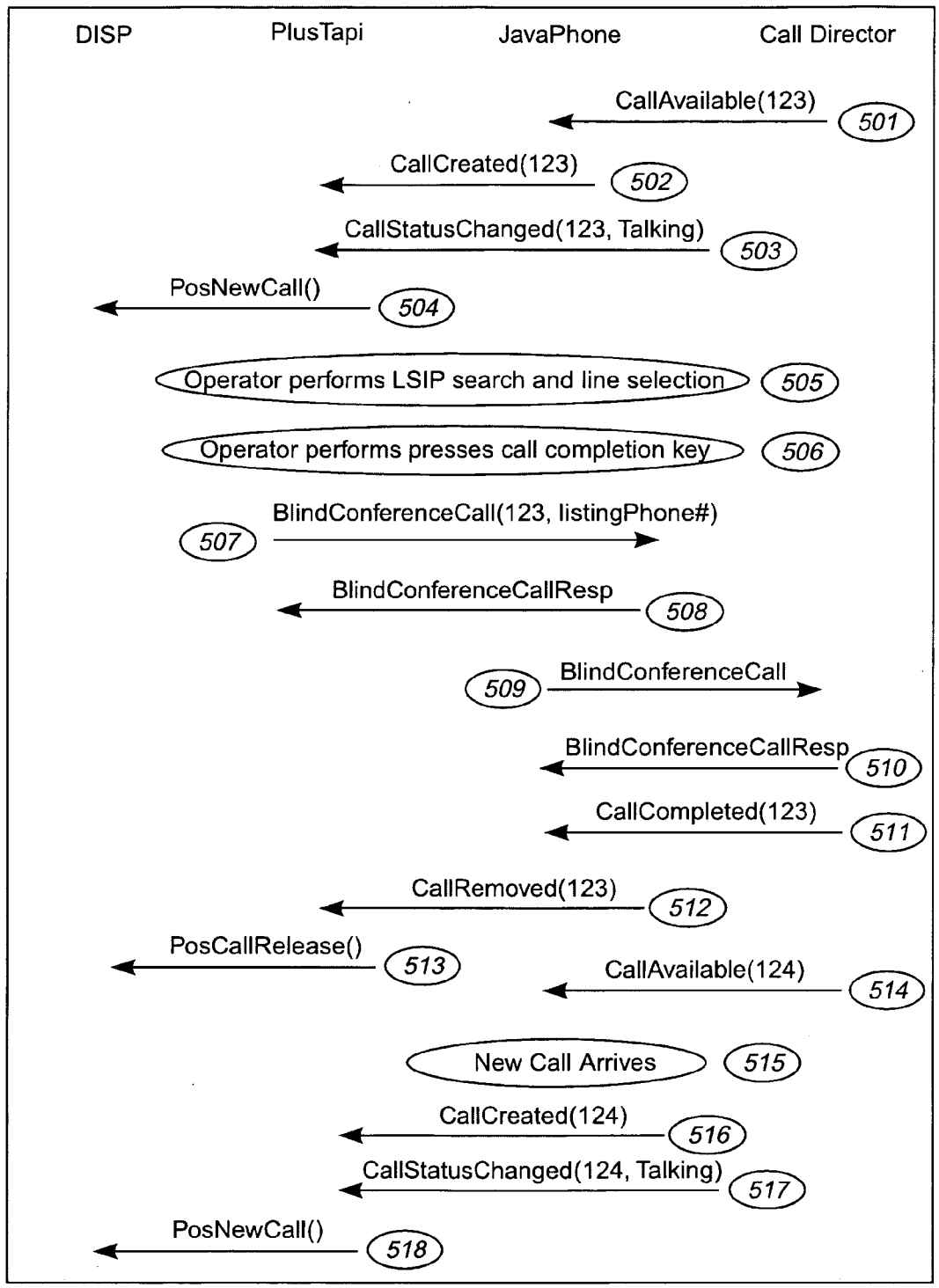
FIG. 10 illustrates an exemplary inbound call message sequence data flow used in some embodiments of the present invention.

Inbound Call Processing (FIG. 10)

After the PlusTapi DLL (110, 6600) has established the socket connection and initialized the JavaPhone telephony environment, it must be prepared to accept any incoming calls. This is accomplished through usage of a "callback" routine as illustrated in FIG. 10. This routine is identified in the enumerated non-persistent variable, "TapiReadAvail", that is specified in the TcpOpen command. Whenever data is received on the socket connection with the JavaPhone application, the callback routine specified with the TapiReadAvail enumerated variable post a WM_USER message to itself so that it can later (on a separate thread of execution) perform a TcpRecv operation and parse through the message(s) received Note that a single TcpRecv operation can contain more than one message from the JavaPhone application.

The basic message format is:
1. Message Length
2. Message Type
3. Message ID
4. Message Status
5. Message Data The callback routine must parse through each buffer of data received and perform the required actions.

The PlusTapi DLL's (110, 6600) callback routine will handle all incoming calls received over the network. Each DA call consists of several messages being sent and received between PlusTapi and the JavaPhone application. As can be seen in the figure below, the JavaPhone application (105, 4400) will send two messages on each call arrival:
1. CallCreated
2. CallStatusChanged Once the call is established, PlusTapi will perform any requested advisements on the TapiEventCall macro callback event. This provides a means for the Call Status Window to be updated to reflect that a call is now active. Similarly, when the CallRemoved message is received, PlusTapi will perform any requested advisements on the TapiEventNoCall macro event. This would complete the sequence for each call arrival. The PlusTapi DLL (110, 6600) contains a state machine that tracks the required messaging.

Any updating of the Call Status Window display (through the macro event advisements) is not be performed until all of the messaging is completed for the call arrival sequence. If an unexpected message is received (unknown or out of sequence), the error is logged and a standard Windows™ Messagebox is generated, informing the operator that an error has occurred related to the switch messaging.

Figure 12:
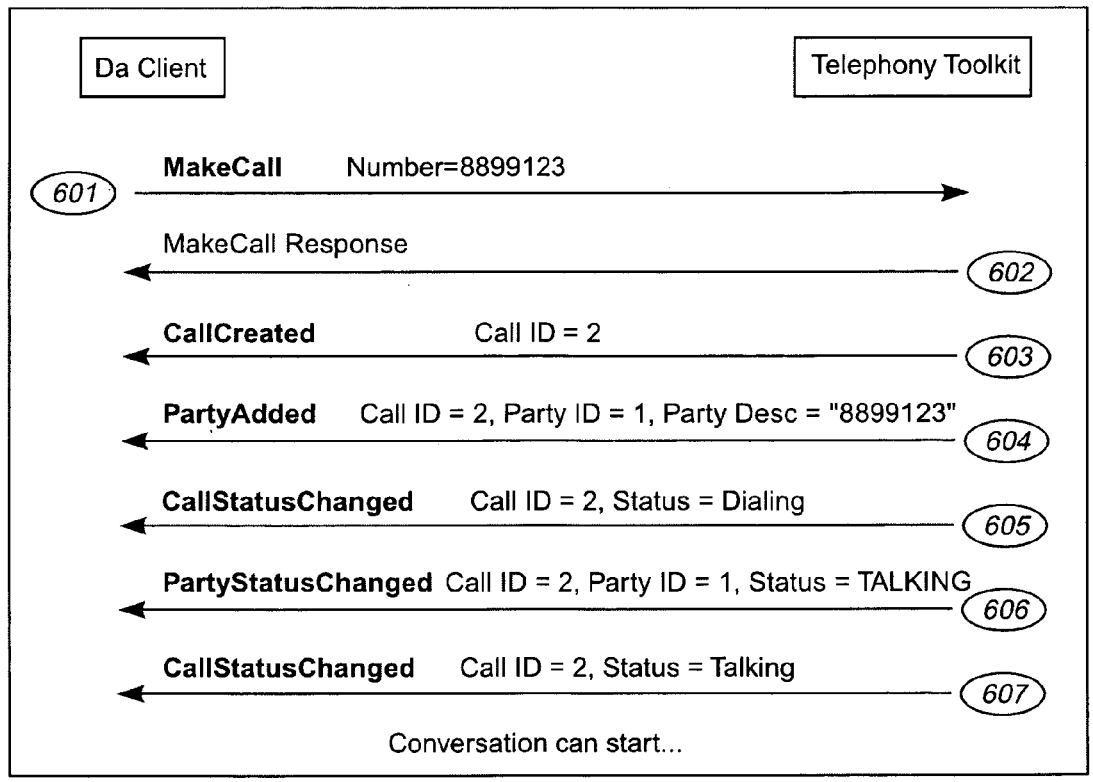
FIG. 12 illustrates an exemplary outbound message sequence data flow used in some embodiments of the present invention.

Outbound Call Processing (FIG. 12)

This feature may not be included in many invention embodiments. The PlusTapi DLL (110, 6600) allows the operator to dial an outbound call. A command, TapiMakeCall, can associated with a DISP Macro Key. This command will generate a small Windows™ dialog box, allowing the operator to enter the target phone number. The dialog box should be centered in the screen and appear as depicted in the exemplary embodiment of FIG. 11.

The operator is able to enter a phone number that contains any number of digits and possibly dashes or parentheses. The operator will then either press the standard Windows™ Enter key or the Alt-D key combination to initiate the dialing sequence. The PlusTapi DLL (110, 6600) will then invoke the corresponding JavaPhone command (MakeCall) to initiate the call. If the operator presses either the standard Windows™ Escape key or the Alt-C key combination, the dialog will be dismissed without the number being dialed.

The JavaPhone application (105, 4400) will produce the message sequence as illustrated in FIG. 12. The PlusTapi DLL (110, 6600) will generally display any error that is detected in a standard Windows™ Messagebox.

Figure 13:
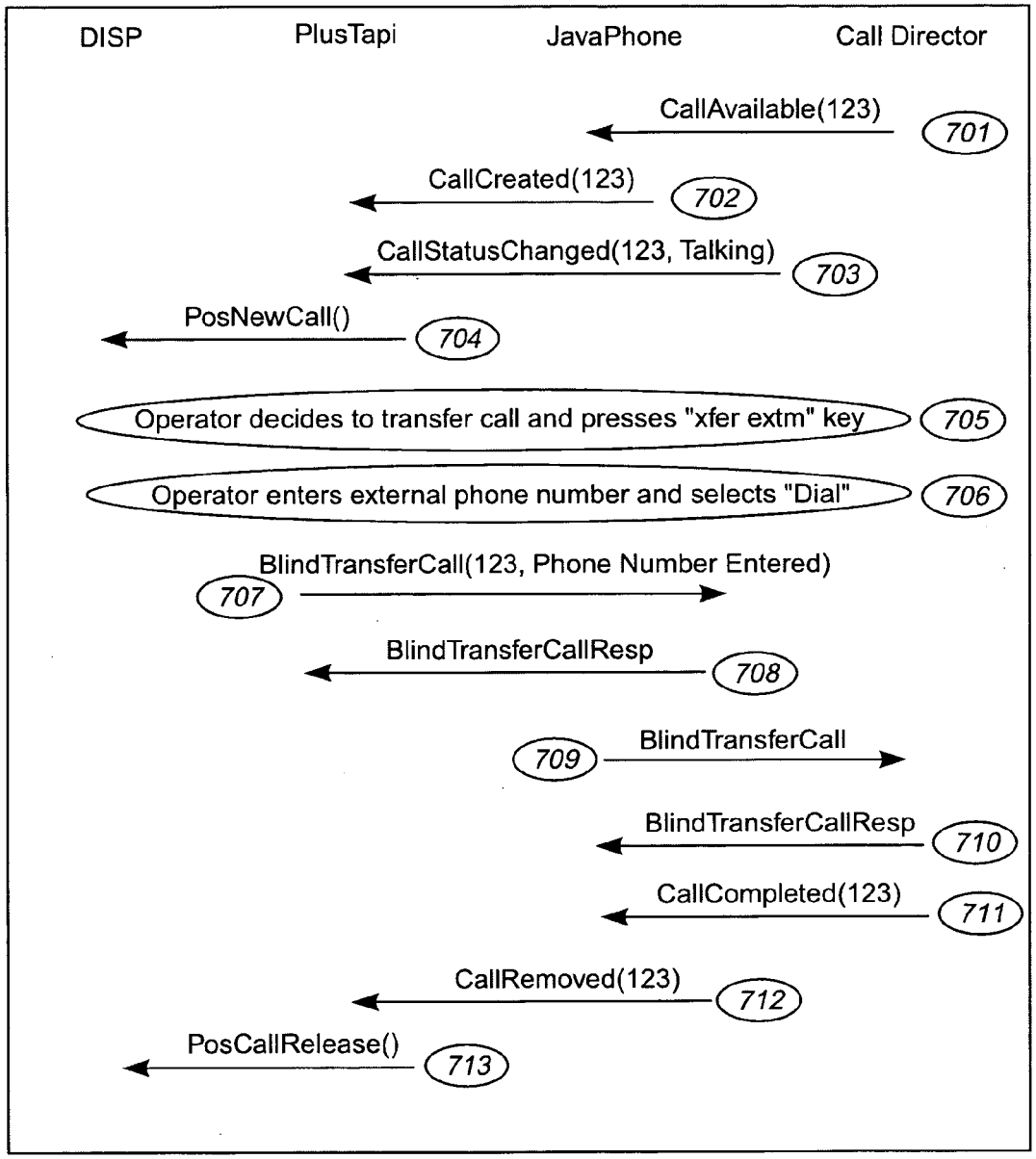
FIG. 13 illustrates an exemplary call hold/unhold message sequence data flow used in some embodiments of the present invention.

Call Hold Processing (FIG. 13)

The PlusTapi DLL (110, 6600) supports placing a call on hold and removing a call from hold. Three commands are defined:
1. TapiHoldCall (6622);
2. TapiUnholdCall (6623);
3. TapiHoldToggle (6620).

The TapiHoldCall command includes a parameter that specifies the Call ID. However, normal usage of this command is to leave the parameter blank, placing the active call on hold. Whenever this command is invokes, the PlusTapi DLL (110, 6600) stores the Call ID of the active call so that it can be utilized when the call is removed from hold. This command invokes the corresponding JavaPhone command, HoldCall. The TapiHoldCall command does not wait for the response from the HoldCall command. When the HoldCall response is asynchronously received, PlusTapi performs an advisement on the TapiEventHold macro event, allowing for an update to the Call Status Window that indicates that the call is now on hold. If an error is received with the HoldCall response, PlusTapi generates a Windows™ Messagebox with the error information for the operator.

The TapiUnholdCall command also includes a parameter for specifying the Call ID. However, normal usage of this command is to leave the parameter blank, unholding the last call placed on hold through usage of the TapiHoldCall command. This command invokes the corresponding JavaPhone command (UnholdCall) that requires a Call ID to be specified. The TapiUnholdCall command will not wait for the response from the JavaPhone UnholdCall command. When the UnholdCall response is asynchronously received, PlusTapi DLL (110, 6600) performs an advisement on the TapiEventUnhold macro event, allowing for an update to the Call Status Window that indicates that the call is now off hold. If an error is received with the UnholdCall response, PlusTapi DLL (110, 6600) will generate a Windows™ Messagebox with the error information for the operator.

The TapiHoldToggle command performs an internal call to either the TapiHoldCall or TapiUnholdCall commands, depending on the current state of the call. It is anticipated that the customer will have a DISP Macro Key or IWSP Softkey defined that includes this command, allowing the operator to press a single key that will either place the call on hold or remove it from hold. Through usage of the Call Status Window, the operator should also be presented with a visual indication of the current hold status.

FIG. 13 illustrates an exemplary message sequence involved with a call hold and unhold operation.

Figure 14:
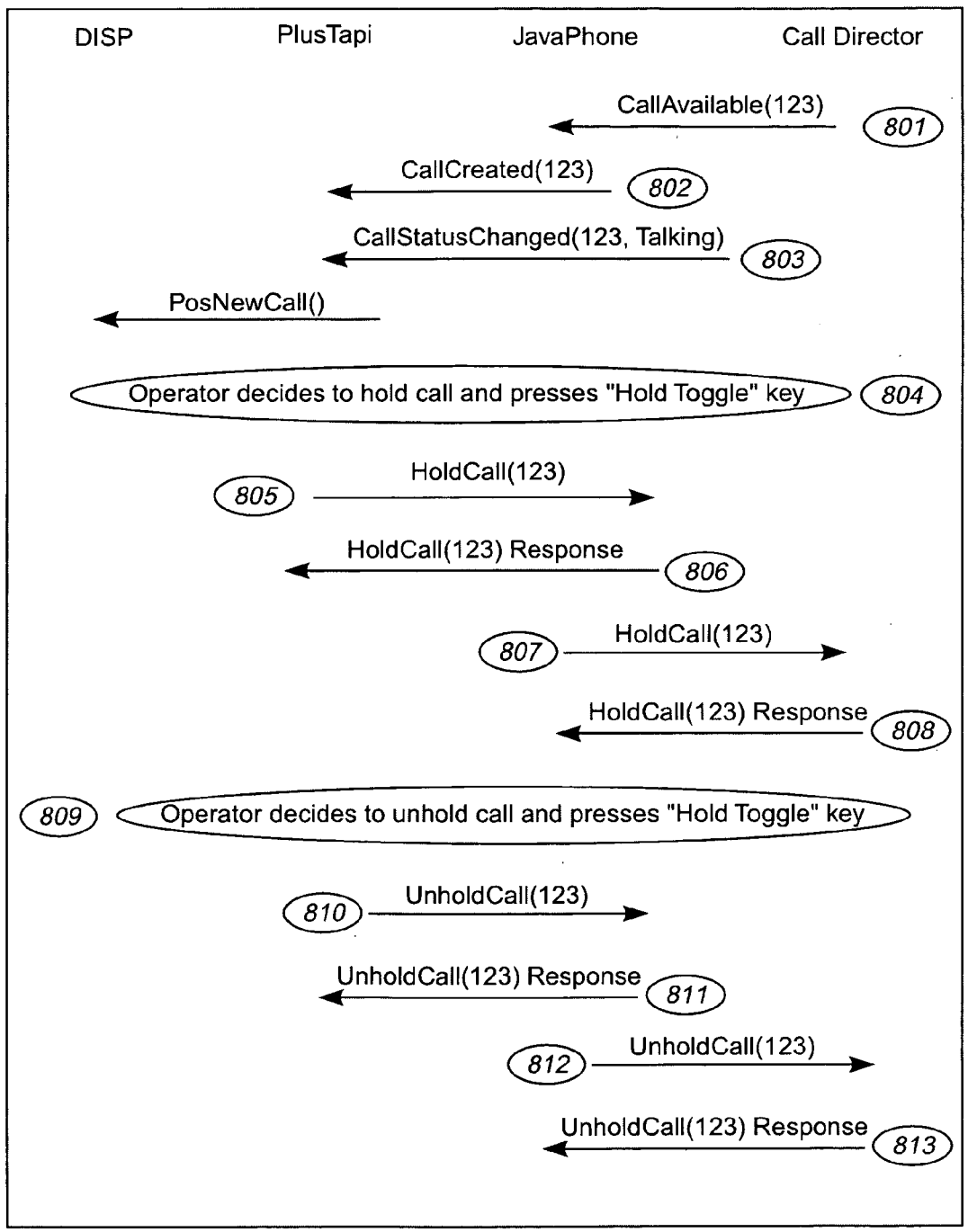
FIG. 14 illustrates an exemplary call transfer to outside number message sequence data flow used in some embodiments of the present invention.

Call Transfers (FIG. 14)

Figure 11:
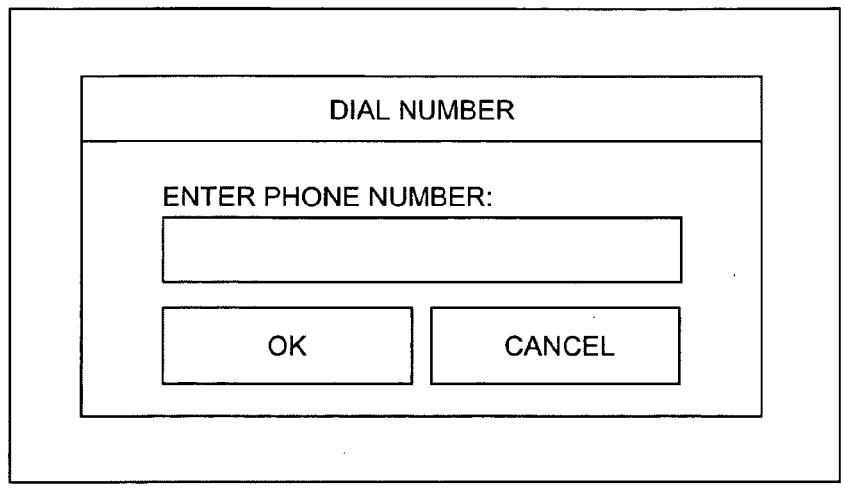
FIG. 11 illustrates an exemplary dial number dialog used in some embodiments of the present invention.

This feature is optional in a production system. PlusTapi (110, 6600) allows the operator to transfer an active call to another number. The command, TapiBlindXferCall, accepts a single parameter that specifies the target phone number to transfer the active call to. If the parameter is left blank, the DialNumber Dialog as shown in FIG. 11 is displayed. The TapiBlindXferCall command invokes the corresponding command, BlindTransferCall, of the JavaPhone application, supplying the Call ID of the active call and the target phone number (from either the dialog box or command parameter).

PlusTapi (110, 6600) performs the required messaging with the JavaPhone application (105, 4400) to complete the call transfer operation. FIG. 11 shows the message sequence involved with a call transfer in which the operator enters another phone number using the Dial Number Dialog box (FIG. 11).

Figure 15:
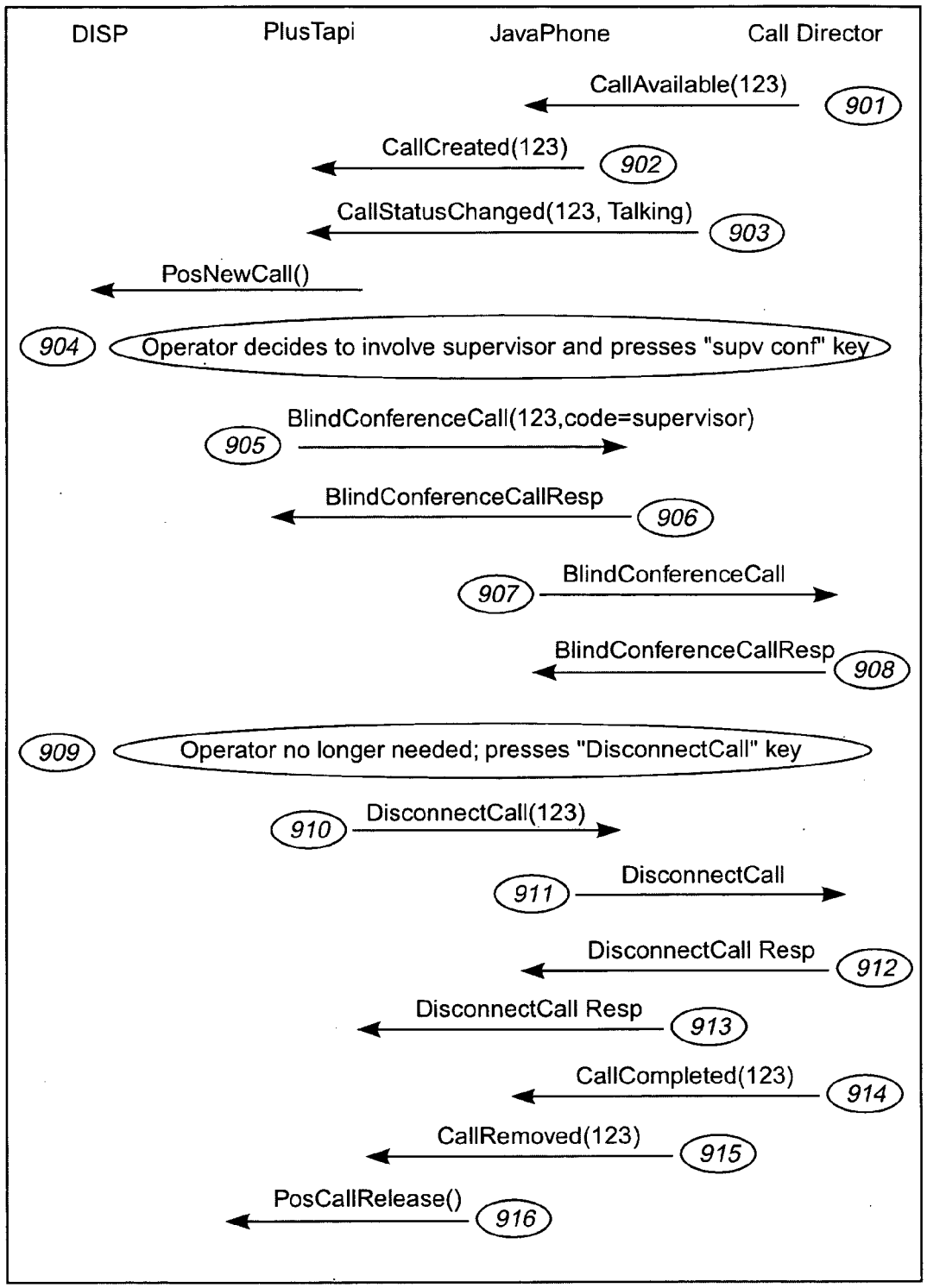
FIG. 15 illustrates an exemplary call conference with supervisor message sequence data flow used in some embodiments of the present invention.

Call Conferencing (FIG. 15)

PlusTapi (110, 6600) allows the operator to conference an active call with another party, another available operator, or another available supervisor. The command, TapiBlindConfCall, accepts a single parameter that specifies the target phone number to include in the conference with the active call. If the parameter is left blank, the Dial Number Dialog as illustrated in FIG. 11 is displayed. The TapiBlindConfCall command invokes the corresponding command, BlindConferenceCall, of the JavaPhone application, supplying the Call ID of the active call and the target phone number (from either the dialog box or command parameter).

Figure 16:
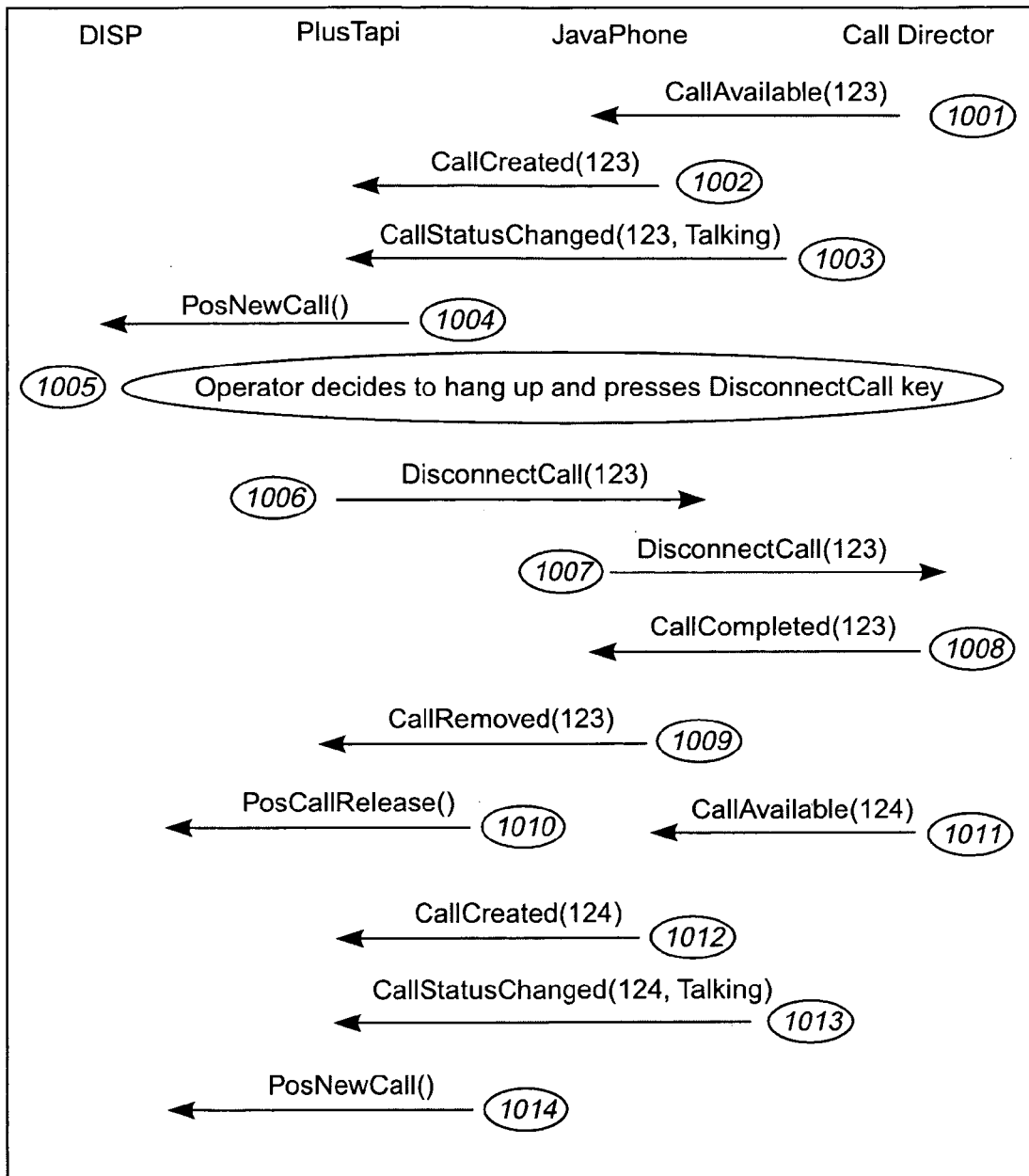
FIG. 16 illustrates an exemplary operator hangup with disconnect call key message sequence data flow used in some embodiments of the present invention.

PlusTapi DLL (110, 6600) performs the required messaging with the JavaPhone application (105, 4400) to complete the call conference operation. FIG. 16 contains the message flow for a call conferencing operation between the caller, the operator, and another supervisor. In the depicted scenario, the operator eventually presses the DisconnectCall key to drop off the call, leaving the supervisor connected with the caller.

Call Disconnect (FIG. 16)

When the operator has a need to disconnect from an active call, the JavaPhone DisconnectCall command is generated through a DISP Macro key or Softkey invoking the PlusTapi TapiDisconnect command.

FIG. 16 illustrates an exemplary message sequence that may occur when the operator presses the "DisconnectCall" key.

Ready/Not Ready Controls

Three commands are enumerated by PlusTapi for controlling the Ready/Not Ready status of the workstation:
1. TapiReady (6632);
2. TapiNotReady (6631); and
3. TapiReadyToggle (6641).

The first two commands can be assigned to separate DISP Macro keys. However, it is anticipated that the customer will prefer to use the toggle function provided with the third command, TapiReadyToggle. The TapiReadyToggle command tracks the current state of the position and internally invokes either the TapiReady or TapiNotReady command, depending on the current state of the position.

There are three possible macro events that can be triggered through usage of the above commands:
1. TapiEventReady
2. TapiEventNotReady
3. TapiEventNotReadyPend If a call is active when the operator requests to be placed in the "not ready" state, the operator will first be placed in the "not ready pending" state. This will prevent any subsequent calls from being sent to the position; however, the operator will not enter the "not ready" state until the active call has completed. The PlusTapi DLL tracks the "pending" state since the JavaPhone and Call Director consider the operator in the "not ready" state even when a call is active. This implies that PlusTapi must know to trigger the macro event, TapiEventNotReady, whenever the active call is terminated during a "not ready pending" state.

The TapiReady and TapiNotReady commands do wait for the response from the corresponding JavaPhone commands. When the responses are asynchronously received, PlusTapi will perform an advisement on either the TapiEventReady or TapiEventNotReady macro events. This provides for a means of updating the Call Status Window with an indication of the agent's state. If an error is received with the JavaPhone response, PlusTapi will generate a Windows Messagebox containing with the error information for the operator.

Volume Control

Three commands are enumerated by PlusTapi (110, 6600) for controlling the volume of the headset:
1. TapiVolumeUp (6643);
2. TapiVolumeDown (6644);
3. TapiVolumeSet (6633).

Each of these commands requires a parameter with a value of 1 to 100, indicating the amount to increase or decrease the headset volume. Since the JavaPhone application (105, 4400) sets the absolute value of the volume (not an increase or decrease) through a property setting, the PlusTapi DLL (110, 6600) tracks the current value that was last used with the SetProperty command. When the TapiVolumeUp command is invoked, the value provided as the parameter of this command is used as the increment to the current value (the value last specified with the SetProperty command). The incremented value is saved as the current headset volume and used as the parameter for the SetProperty command. Similarly, the TapiVolumeDown command will decrement the current value and then pass it as the parameter in the JavaPhone SetProperty command.

The TapiVolumeSet command would be used to set the volume to an absolute value by passing it a parameter indicating the percentage of full volume (0–100). This command could be used to reset the volume to a predetermined acceptable setting, allowing the operator to press a single key after having temporarily adjusted the volume manually. It could also be used in a start-up macro as a means of setting the volume to a predefined value.

PlusTapi will provide a macro callback event that would allow the user to configure the Call Status Window to contain a single InfoWin Field that displays the numeric value of the volume setting (0–100).

Microphone Gain Control

Four commands are enumerated by PlusTapi DLL (110, 6600) for controlling the microphone gain:
1. TapiMicGainUp (6645);
2. TapiMicGainDown (6646);
3. TapiMicGainSet (6647);
4. TapiMuteToggle (6642);

Each of these commands require a parameter with a value of 1 to 100, indicating the amount to increase or decrease the microphone gain (the volume that the subscriber hears). Since the JavaPhone application (105, 4400) sets the absolute value (not an increase or decrease) of the microphone gain with the SetProperty command, the PlusTapi DLL (110, 6600) tracks the current setting that was last used with the SetProperty command. When the TapiMicGainUp command is invoked, the value provided as the parameter of this command is used as the increment to the current value (the value last specified with the SetProperty command). The incremented value is saved as the current microphone gain value and used as the parameter for the SetProperty command. Similarly, the TapiMicGainDown command will decrement the current value and then pass it as the parameter in the JavaPhone SetProperty command.

The TapiMicGainSet command would be used to set the microphone gain to an absolute value by passing it a parameter indicating the percentage of full gain (0–100). This command could be used to reset the microphone gain to a predetermined acceptable range, allowing the operator to press a single key after having temporarily adjusted the gain manually.

The TapiMuteToggle command acts as a microphone mute toggle function. If the current microphone gain setting is non-zero, this command sets the microphone gain to zero (i.e. —mute the microphone) and saves off the previous setting. If the current microphone setting is zero, this command restores the previous setting (i.e. —unmute the microphone).

PlusTapi also provides a macro callback event that would allow the user to configure the Call Status Window to contain a single InfoWin Field that displays the numeric value of the gain setting (0–100).

Property Settings

The JavaPhone application (105, 4400) contains a set of "properties" that can be accessed or altered. The property values, are displayed in the following table:

TABLE 1

Property Settings

| Property name | Property values |
| --- | --- |
| HoldPlayFile | A wave file name (e. g. - "c:\iws \holdmusic.wav" |
| AudioDevice | ShelCad SoundCard |
| AudioMode | HeadSet |
| | FullDuplex |
| | HalfDuplexAuto |
| | HalfDuplexMan |
| ComPort | 1 |
| | 2 |
| | 3 |
| | 4 |
| Gateway Address | The default PSTN gateway address |
| AudioCoder | G711AL |
| | G711ML |
| | G723 |
| | GSM |
| | AUTO |
| ConnectionType | DialUp LAN |
| Volume | 1–100 |
| MicGain | 1–100 |

PlusTapi enumerates two commands:
1. TapiSetProperty (6635);
2. TapiGetPropery (6636).

The TapiSetProperty (6635) command can be used to select one of the available properties and change its value. The TapiGetProperty (6636) command will retrieve the named property and display it in a standard Windows™ Messagebox. These commands will invoke the corresponding SetProperty and GetProperty commands of the JavaPhone application. It is not anticipated that either of these commands is needed for operator usage but are provided for potential administrative or diagnostic purposes.

Shutdown

The PlusTapi DLL (110, 6600) implementation of the IWSP "DLLTerminate" API routine invokes the ShutDown command to the JavaPhone application (105, 4400) so that it can perform its required termination across the TAPI interface.

PlusTapi DLL (110, 6600) can also receive the ShutDown message from the JavaPhone unsolicitedly due to some external event (from the Call Director, VoD Gateway, etc.). In this case, PlusTapi DLL (110, 6600) clears the internal state (assume all calls have been terminated and the operator is already logged off) and initiate a DISP signoff.

PlusTagi Enumerated Commands (6602)

The following sections provide the formats for each of the proposed commands that is enumerated by the PlusTapi DLL (110, 6600). Additional information about the corresponding JavaPhone commands can be found in the JTAPI standard specification.

TapiMakeCall (6621)

This feature is optional in the production system. This command is used to establish a phone call to the requested address. When only a telephone number is given, the default gateway address is used. This command will generate a Windows™ Dialog box as described in the section, Outbound Call Processing. This command will invoke the JavaPhone's MakeCall command once the operator enters the target phone number.

| Format: | TapiMakeCall (sPhoneNumber) | |
|---|---|---|
| Parameters: | sPhoneNumber | The phone number to be dialed. If this parameter is blank, a Windows ™ dialog box is displayed (see the section Dial be Number Dialog) |
| Returns: | PLUS_COMMAND_OK | Command executed successfully. |
| | PLUS_COMMAND_NOT_AVAIL | PlusTapi DLL not installed. |
| | PLUS_COMMAND_ERROR | General failure occurred. |

TapiHoldCall (6622)

This command will place a call on hold. When no call id is specified (normal usage) the active call is put on hold. When a successful response to this message from the JavaPhone application (105, 4400) is received, PlusTapi will perform any requested advisement on the TaptiEventHold macro event.

| Format: | TapiHoldCall (sCallID) | |
|---|---|---|
| Parameters: | sCalIID | The specified Call ID that should be put on hold. This parameter would normally be blank to lace the current call on hold. |
| Returns: | PLUS_COMMAND_OK | Command executed successfully. |
| | PLUS_COMMAND_NOT_AVAIL | PlusTapi DLL not installed. |
| | PLUS_COMMAND_ERROR | General failure occurred. |

TapiUnholdCall (6623)

This command will remove the specified call from hold. When no call ID is provided (normal usage) it will unhold the last call placed on hold. When a successful response to this message from the JavaPhone application (105, 4400) is received, PlusTapi will perform any requested advisements on the TapiEventUnhold user exit.

| Format: | TapiUnHoldCall (sCallID) | |
|---|---|---|
| Parameters: | sCallID | The Call ID that should be taken off hold. This parameter would normally be blank to unhold the last call placed on hold with the TapiHoldCall command. |
| Returns: | PLUS_COMMAND_OK | Command executed successfully. |
| | PLUS_COMMAND_NOT_AVAIL | PlusTapi DLL not installed. |
| | PLUS_COMMAND_ERROR | General failure occurred. |

TapiHoldToggle (6620)

This command will toggle the hold state of the specified call. When no call ID is provided (normal usage) it will unhold the last call placed on hold or place the active call on hold. When a successful response to this message from the JavaPhone application (105, 4400) is received, PlusTapi will perform any necessary advisements on either the TapiEventHold or the TapiEventUnhold macro events.

| Format: | TapiHoldToggle (sCallID) | |
|---|---|---|
| Parameters: | sCallID | The Call ID that should be placed on hold or taken off hold. This parameter would normally be blank to hold the active call or unhold the last call placed on hold with the TapiiHoldCall command. |
| Returns: | PLUS_COMMAND_OK | Command executed successfully. |
| | PLUS_COMMAND_NOT_AVAIL | PlusTapi DLL not installed. |
| | PLUS_COMMAND_ERROR | General failure occurred. |

TapiBlindXferCall (6624)

Note: this feature may not be included in many invention embodiments. This command is used to transfer a call to another party (which is not connected yet), and retrieves the next call in the queue. This command can also be used for transferring the call to either another available operator or a supervisor by setting the sPhoneNumber parameter to one of the following:
1. CODE=OPERATOR
2. CODE=SUPERVISOR

| Format: | TapiBlindXferCall (sPhoneNumber) | |
|---|---|---|
| Parameters: | sPhoneNumber | The phone number to be dialed. If this parameter is blank, a Windows ™ dialog box is displayed (see the section Dial Number Dialog) |
| Returns: | PLUS_COMMAND_OK | Command executed successfully. |
| | PLUS_COMMAND_NOT_AVAIL | PlusTapi DLL not installed. |
| | PLUS_COMMAND_ERROR | General failure occurred. |

TapiDisconnect (6625)

This command will disconnect the identified call or the active call if none is specified.

| Format: | TapiDisconnect (sCallID) | |
|---|---|---|
| Parameters: | sCallID | The Call ID that is to be disconnected. If this parameter is blank, the currently active call is disconnected. |
| Returns: | PLUS_COMMAND_OK | Command executed successfully. |
| | PLUS_COMMAND_NOT_AVAIL | PlusTapi DLL not installed. |
| | PLUS_COMMAND_ERROR | General failure occurred. |
| | −3 | No call active or invalid Call ID. |

TapiBlindConfCall (6626) This command will initiate a conference call with a third party. This command can also be used for transferring the call to either another available operator or a supervisor by setting the sPhoneNumber parameter to one of the following:
1. CODE=OPERATOR
2. CODE=SUPERVISOR

| Format: | TapiBlindConfCall (sPhoneNumber) | |
|---|---|---|
| Parameters: | sPhoneNumber | This phone number is to be dialed. If this parameter is blank, a Windows ™ dialog box is displayed (see the section Dial Number Dialog) |
| Returns: | PLUS_COMMAND_OK | Command executed successfully. |
| | PLUS_COMMAND_ NOT_AVAIL | PlusTapi DLL not installed. |
| | PLUS_COMMAND_ ERROR | General failure occurred. |
| | −3 | No call active or invalid phone number. |

TapiDTMF (6640)

This command will generate a DTMF (Dual Tone Multi-frequency) signal via the JavaPhone application. This command can be utilized to send individual DTMF signals or multiple signals (for multiple digits). For example, to send individual signals, separate commands could be assigned to a numeric keypad (e.g., numeric keypad digit 7 would invoke the command TapiDTMF(7), which would result in a single DTMF for number 7 being generated.

| Format: | TapiDTMF (sDigits) | |
|---|---|---|
| Parameters: | sDigits | One or more digits for which to generateDTMF signals. |
| Returns: | PLUS_COMMAND_OK | Command executed successfully. |
| | PLUS_COMMAND_ NOT_AVAIL | PlusTapi DLL not installed. |
| | PLUS_COMMAND_ ERROR | General failure occurred. |
| | −3 | No call active |

TapiLogon (6628)

PlusTapi will store the "Agent ID" returned from the JavaPhone with a successful logon for usage with subsequent commands that require this parameter.

| Format: | TapiLogon (sUserID, sPassword) | |
|---|---|---|
| Parameters: | sUserID | The User ID of the operator |
| | sPassword | The password of the operator |
| Returns: | PLUS_COMMAND_OK | Command executed successfully. |
| | PLUS_COMMAND_ NOT_AVAIL | PlusTapi DLL not installed. |
| | PLUS_COMMAND_ ERROR | General failure occurred. |

TapiLogoff (6629)

Note that the "Agent ID" used in the invocation of the corresponding parameter of this command can either be supplied (most likely by another DLL or stand-alone application) or if left blank, PlusTapi will supply the Agent ID returned with the last successful logon.

| Format: | TapiLogoff (sAgentID) | |
|---|---|---|
| Parameters: | sAgentID | The Agent ID of the operator, returned with a previous logon. If this parameter is left blank, PlusTapi will use the Agent ID that it stored internally from the last successful logon. |
| Returns: | PLUS_COMMAND_OK | Command executed successfully. |
| | PLUS_COMMAND_ NOT_AVAIL | PlusTapi DLL not installed. |
| | PLUS_COMMAND_ ERROR | General failure occurred. |

TapiReadyToggle (6641)

PlusTapi DLL (110, 6600) will track the current state of the agent (either "ready" or "not ready"). Invocation of this command will toggle the position from its current state. When a successful response from the JavaPhone application (105, 4400) is received for this message, PlusTapi DLL (110, 6600) will perform any necessary advisements on either the TapiEventReady, TapiEventNotReady, or the TapiEventNotReadyPend macro event.

| Format: | TapiReadyToggle (sAgentID) | |
|---|---|---|
| Parameters: | SAgentID | The Agent ID of the operator, returned with a previous logon. If this parameter is left blank, PlusTapi DLL (110, 6600) will use the Agent ID that it stored internally from the last successful logon. |
| Returns: | PLUS_COMMAND_OK | Command executed successfully. |
| | PLUS_COMMAND_ NOT_AVAIL | PlusTapi DLL not installed. |
| | PLUS_COMMAND_ ERROR | General failure occurred. |

TapiNotReady (6631)

Invocation of this command will change the current state of the agent to "not ready". When a successful response to this message from the JavaPhone application (105, 4400) is received, PlusTapi DLL (110, 6600) will perform any requested advisements on either the TapiEventNotReady (if no call is active) or the TapiEventNotReadyPend (if a call is active) macro event.

| Format: | TapiNotReady (sAgentID) | |
|---|---|---|
| Parameters: | sAgentID | The Agent ID of the operator, returned with a previous logon. If this parameter is left blank, PlusTapi will use the Agent ID that it stored internally from the last successful logon. |

| Returns: | PLUS_COMMAND_OK | Command executed successfully. |
| --- | --- | --- |
| | PLUS_COMMAND_NOT_AVAIL | PlusTapi DLL not installed. |
| | PLUS_COMMAND_ERROR | General failure occurred. |

TapiReady (6632) Invocation of this command will change the current state of the agent to "ready". When a successful response to this message from the JavaPhone application (105, 4400) is received, PlusTapi DLL (110, 6600) will perform any requested advisements on the TapiEventReady macro event.

| Format: | TapiReady (sAgentID) | |
| --- | --- | --- |
| Parameters: | sAgentID | The Agent ID of the operator, returned with a previous logon. If this parameter is left blank, PlusTapi will use the Agent ID that it stored internally from the last successful to logon |
| Returns: | PLUS_COMMAND_OK | Command executed successfully. |
| | PLUS_COMMAND_NOT_AVAIL | PlusTapi DLL not installed. |
| | PLUS_COMMAND_ERROR | General failure occurred. |

TapiVolumeUp (6643)

This command will increase the level of the headset volume by the specified amount. For example, if the current volume is set to the value of 60 (60% maximum volume), the command TapiVolumeUp(10) would change the current volume setting to 70 (70% of maximum). When a successful response to this message from the JavaPhone application (105, 4400) is received, PlusTapi DLL (110, 6600) will perform any requested advisement on the TapiEventVolChange macro event. A value for the sPercentagePoints parameter which would increase the current setting to a value which is greater than 100 will set the volume to 100%.

| Format: | TapiVolumeUp (sPercentagePoints) | |
| --- | --- | --- |
| Parameters: | sPercentagePoints | The number of percentage points (1–100) that the headset volume should be increased. |
| Returns: | PLUS_COMMAND_OK | Command executed successfully. |
| | PLUS_COMMAND_NOT_AVAIL | PlusTapi DLL not installed. |
| | PLUS_COMMAND_ERROR | General failure occurred. |

TapiVolumeDown (6644)

This command will decrease the level of the headset volume by the specified amount. For example, if the current volume is set to the value of 60 (60% maximum volume), the command TapiVolumeDown(10) would change the current volume setting to 50 (50% of maximum). When a successful response to this message from the JavaPhone application (105, 4400) is received, PlusTapi will perform any requested advisements on the TapiEventVolChange macro event. A value for the sPercentagePoints parameter which would decrease the current setting to a value that is less than 0 will set the volume to 0%.

| Format: | TapiVolumeDown (sPercentagePoints) | |
| --- | --- | --- |
| Parameters: | sPercentagePoints | The number of percentage points (1–100) that the headset volume should be decreased. |
| Returns: | PLUS_COMMAND_NOT_AVAIL | PlusTapi DLL not installed. |
| | PLUS_COMMAND_ERROR | General failure occurred. |

TapiVolumeSet (6633)

This command will set the level of the headset volume to the specified percentage of full volume. For example, if the current volume is set to the value of 80 (80% maximum volume), the command TapiVolumeSet(50) would change the current volume setting to 50 (50% of maximum). When a successful response to this message from the JavaPhone application (105, 4400) is received, PlusTapi will perform any requested advisements on the TapiEventVolChange macro event.

| Format: | TapiVolumeSet (sPercentage) | |
| --- | --- | --- |
| Parameters: | sPercentage | The percentage (0–100) of maximum volume that the headset volume should be set to. |
| Returns: | PLUS_COMMAND_OK | Command executed successfully. |
| | PLUS_COMMAND_NOT_AVAIL | PlusTapi DLL not installed. |
| | PLUS_COMMAND_ERROR | General failure occurred. |

TapiMicGainUp (6645)

This command will increase the level of the microphone gain by the specified amount. For example, if the current microphone gain is set to the value of 60 (60% maximum gain), the command TapiMicGainUp(10) would change the current gain setting to 70 (70% of maximum). When a successful response to this message from the JavaPhone application (105, 4400) is received, PlusTapi will perform any requested advisements on the TapiEventGainChange macro event. A value for the sPercentagePoints parameter which would increase the current setting to a value which is greater than 100 will set the microphone gain to 100%.

| Format: | TapiMicGainU (sPercentagePoints) | |
| --- | --- | --- |
| Parameters: | sPercentagePoints | The number of percentage points (1–100) that the microphone gain should be increased by. |
| Returns: | PLUS_COMMAND_OK | Command executed successfully. |
| | PLUS_COMMAND_NOT_AVAIL | PlusTapi DLL not installed. |

TapiMicGainDown (6646)

This command will decrease the level of the microphone gain by the specified amount. For example, if the current microphone gain is set to the value of 60 (60% maximum gain), the command TapiMicGainDown(10) would change the current gain setting to 70 (70% of maximum). When a successful response to this message from the JavaPhone application (105, 4400) is received, PlusTapi will perform any requested advisements on the TapiEventGainChange macro event. A value for the sPercentagePoints parameter which would decrease the current setting to a value that is less than 0 will set the microphone gain to 0%.

| Format: | TapiMicGainUp (sPercentaePoints) | |
|---|---|---|
| Parameters: | sPercentage Points | The number of percentage points (1–100) that the microphone gain should be increased by. |
| Returns: | PLUS_COMMAND_OK | Command executed successfully. |
| | PLUS_COMMAND_NOT_AVAIL | PlusTapi DLL not installed. |
| | PLUS_COMMAND_ERROR | General failure occurred. |

TapiMicGainSet (6647)

This command will set the level of the microphone gain to the specified percentage of maximum gain. For example, if the current microphone gain is set to the value of 80 (80% maximum gain), the command TapiMicGainSet(50) would change the current gain setting to 50 (50% of maximum). When a successful response to this message from the JavaPhone application (105, 4400) is received, PlusTapi will perform any requested advisements on the TapiEventGainChange macro event.

| Format: | TapiMicGainSet (sPercentage) | |
|---|---|---|
| Parameters: | sPercentage. | The percentage (0–100) of maximum that the micro hone gain should be set to. |
| Returns: | PLUS_COMMAND_OK | Command executed successfully. |
| | PLUS_COMMAND_NOT_AVAIL | PlusTapi DLL not installed. |
| | PLUS_COMMAND_ERROR | General failure occurred. |

TapiMuteToggle (6642)

This command is a microphone mute toggle function. PlusTapi DLL (110, 6600) will check the current setting of the microphone gain (stored internally). If the gain is currently set to a non-zero value, PlusTapi will save the current setting and then set the microphone gain to zero (i.e. —the microphone is muted). If the gain is currently zero, PlusTapi will restore the previously saved setting. When a successful response to this message from the JavaPhone application (105, 4400) is received, PlusTapi will perform any necessary advisements on either the TaptEventMute or TapiEventUnmute macro event.

| Format: | TapiMute_Toggle ( ) | |
|---|---|---|
| Parameters: | None | |
| Returns: | PLUS_COMMAND_OK | Command executed successfully. |
| | PLUS_COMMAND_NOT_AVAIL | PlusTapi DLL not installed. |
| | PLUS_COMMAND_ERROR | General failure occurred. |

TapiSetProperty (6635)

This command is used for changing one of the available properties in the JavaPhone application. Refer to the Property Settings table in FIG. 17 for additional information on the available properties and their possible values. Note that all property names and values are provided in string format.

| Format: | TapiSetProperty (sPropertyName, sPropertyValue) | |
|---|---|---|
| Parameters: | sPropertyName | The name of the JavaPhone application property that is to be updated. |
| | sProperty Value | The new property value. |
| Returns: | PLUS_COMMAND_OK | Command executed successfully. |
| | PLUS_COMMAND_NOT_AVAIL | PlusTapi DLL not installed. |
| | PLUS_COMMAND_ERROR | General failure occurred. |

TapiGetProperty (6636)

This command is primarily intended for diagnostic purposes. It will request the specified property from the JavaPhone application (105, 4400) and display it in a standard Windows™ Messagebox.

| Format: | TapiGetProperty (sPropertyName) | |
|---|---|---|
| Parameters: | sPropertyName | The name of the JavaPhone application property that is to be accessed and displayed in a Windows ™ Messagebox. |
| Returns: | PLUS_COMMAND_OK | Command executed successfully. |
| | PLUS_COMMAND_NOT_AVAIL | PlusTapi DLL not installed. |
| | PLUS_COMMAND_ERROR | General failure occurred. |

TapiShutDown (6637)

This command can be invoked in order to request the JavaPhone application (105, 4400) to terminate. Note that this command would not be needed for normal workstation operation as the PlusTapi DLL (110, 6600) will terminate the JavaPhone application (105, 4400) when D1SP/IWSP terminates.

| | | |
|---|---|---|
| Format: | TapiShutDown ( ) | |
| Parameters: | None | |
| Returns: | PLUS_COMMAND_OK | Command executed successfully. |
| | PLUS_COMMAND_NOT_AVAIL | PlusTapi DLL not installed. |
| | PLUS_COMMAND_ERROR | General failure occurred. |

TapiPing (6638)

This diagnostic command can be used to test the message path between the client application and the Call Director by sending a test message. PlusTapi will send the corresponding message to the JavaPhone application. When the response is received, PlusTapi will generate a standard Windows™ Messagebox informing the user that the ping response has been received.

| | | |
|---|---|---|
| Format: | TapiPing ( ) | |
| Parameters: | None | |
| Returns: | PLUS_COMMAND_OK | Command executed successfully. |
| | PLUS_COMMAND_NOT_AVAIL | PlusTapi DLL not installed. |
| | PLUS_COMMAND_ERROR | General failure occurred. |

TapiDisplayErrs (6648)

This command is used for setting the operating mode of the PlusTapi DLL (110, 6600). When the parameter, sParm, is set to "YES", PlusTapi DLL (110, 6600) will generate a Windows™ Messagebox containing an informative message whenever an error is detected during the execution of one of the available PlusTapi commands. When the parameter, sparm, is set to "NO", PlusTapi will not display any Messageboxes but will instead report all failures back through the IWSP API. The default setting after startup is to display errors to the operator.

| | | |
|---|---|---|
| Format: | TapiDisplayErrs (sParm) | |
| Parameters: | sParm | The sParm is set to one of two possible values: YES NO |
| Returns: | PLUS_COMMAND_OK | Command executed successfully. |
| | PLUS_COMMAND_NOT_AVAIL | PlusTapi DLL not installed. |
| | PLUS_COMMAND_ERROR | General failure occurred. |

Plus Tapi Enumerated Data Variables

The PlusTapi DLL (110, 6600) will enumerate variables to the IWSP platform containing the following audio and call status values:
1. TapiPositionStatus
2. TapiLogonStatus
3. TapiAgentID
4. TapiCallID
5. TapiCallStatus
6. TapiPartyStatus
7. TapiVolumeLevel
8. TapiMicGainLevel
9. TapiHeadSetStatus Each of the above-enumerated variables also support the generation of DLL and DDE advisements whenever their values are altered.

PlusTapi DLL (110, 6600) also enumerates two variables used for recording error conditions:
1. TapiLastErrCode
2. TapiLastCmdErr.

The descriptions of these variables are provided in the following sections.

TapiPositionStatus

This data item contains the status of the position as follows:
1. 0—Idle (not logged on)
2. 1—Position ready to accept calls
3. 2—Position not ready to accept calls
4. 3—Position has call active A value of 0 indicates that no operator has logged on. All other states imply that an operator has successfully logged on.

Format: NULL terminated ASCII string (1 character plus terminating NULL).

TapiLogonStatus

This data item contains the string returned from the JavaPhone application (105, 4400) and the Call Director in the AgentLogon response message.

Format: NULL terminated ASCII string

TapiAgentID

This data item contains the current Agent ID returned from the JavaPhone application (105, 4400) after a successful logon to the Call Director. If the position is not presently logged on, the variable is NULL.

Format: NULL terminated ASCII string

TapiCallID

This data item contains the current Call ID that was received from the JavaPhone application. If no call is active, the variable is NULL.

Format: NULL terminated ASCII string

TapiCallStatus

This data item contains the status of the current call in the JavaPhone application. It will contain one of the following enumerated strings, or NULL if no call is active:
1. INITIATED
2. RINGING
3. TALKING
4. HELD
5. DIALING Format: NULL terminated ASCII string TapiPartyStatus This data item contains the party status of the current call in the JavaPhone application. It will contain one of the following enumerated strings, or NULL if no call is active:
1. INITIATED
2. ALERTED
3. TALKING
4. HELD Format: NULL terminated ASCII string TapiVolumeLevel This data item contains the current volume level setting of the headset. Possible values are 0 to 100.

Format: NULL terminated ASCII string (1 to 3 digits plus a NULL)

TapiMicGainLevel

This data item contains the gain setting of the microphone. Possible values are 0 to 100.

Format: NULL terminated ASCII string (1 to 3 digits plus a NULL).

TapiHeadSetStatus

This variable contains the current status of the operator headset as indicated in the HeadSetStatusChanged message most recently received from the JavaPhone application. It contains one of the two following values:
1. IN
2. OUT Format: NULL terminated ASCII string TapiConnectionStatus This variable contains the current status of the JavaPhone connections to the Voice Over Data Gateway and the Call Director. It contains one of the two following values:
1. Connected
2. Disconnected Format: NULL terminated ASCII string TapiLastErrCode This data item contains the return code value received during the execution of the last command that failed or was generated by a PlusTapi internal error. This variable is automatically cleared when its value has been requested. Other IWSP DLLs or standalone applications can respectively request a DUX or DDE advisement whenever this variable is changed. This will allow for the requesting application to be informed whenever an error is asynchronously received from the JavaPhone application.

Format: short

TapiLastCmdErr

This data item contains the name of the last command that failed during its execution. This variable is automatically cleared when its value has been requested. Note that this variable can be NULL (even when the TapiLastErrCode contains a value) if the error is due to a condition that was not the direct result of executing one of the available PlusTapi commands.

Format: NULL terminated ASCII string (up to 24 characters plus terminating NULL)

Plus Tapi Error Handling

PlusTapi has two modes of operation related to error handling:
1. "Error Display" mode—any detected errors is reported to the operator in a Windows™ Messagebox.
2. "No Display" mode—any detected errors is reported back through the IWSP API without being displayed tP the operator in a Messagebox.

The "Error Display" mode is the default setting for the position after successful startup. The "No Display" mode can be selected only through the invocation of the provided command, TapiDisplayErrs. With this mode, errors are reported back through the IWSP platform so that the invoking IWSP DLL or standalone application (using DDE) can handle the error programmatically.

Whenever any of the PlusTapi DLL (110, 6600) enumerated commands experiences a failure (regardless of the operating mode), PlusTapi will store the specific return code (e.g., as provided by the JavaPhone application) in the enumerated variable, TapiLastErrCode. The command that generated the failure (if any) will also be stored in the enumerated variable, TapiLastCmdErr. If PlusTapi is in the "Error Display" mode, the command will always return the PLUS_COMMAND_OK status to the platform after the Messagebox is displayed. If PlusTapi is in the "No Display" mode, the command will always return the general failure status, PLUS_COMMAND_ERROR, to the invoking IWSP DLL or standalone application whenever the error is detected on the same thread of execution. In the case that the error is received with an asynchronous response from the JavaPhone application, PlusTapi will perform any DUX or DDE advisements previously requested on the TapiLastErrCode variable. The invoking application should then immediately request the TapiLastErrCode and the TapiLastCmdErr values whenever failure status is returned.

Any of the JavaPhone responses that report an error will include a return code. PlusTapi (110, 6600) enumerates a message string for each of the possible error conditions, allowing the customer to alter the textual content through usage of the IWSP Define Language utility. Errors will normally be reported to the operator by displaying a standard Windows™ Messagebox. PlusTapi will also generate a Windows™ Messagebox for each of the possible errors that can be returned by the PlusTcp DLL. Note that the strings for each corresponding error that the PlusTcp DLL can detect are enumerated by the PlusTcp DLL (109, 5500) (even though it will always return a numeric return code and never display any text).

PlusTapi (110, 6600) attempts to recover from conditions involving lost connections between the JavaPhone application (105, 4400) and either the Voice Over Data Gateway or the Call Director. The recovery involves a retry sequence that is described in section PlusTapi Startup. PlusTapi will not attempt to recover from any severe errors received either from PlusTcp or the JavaPhone. All errors will also be logged.

Plus Tapi Macro Advisement Events

PlusTapi (110, 6600) also supports "DUX" macro callback advisements on selected "events", allowing for the invocation of user-defined macros. This macro advisement support is utilized for displaying informational text in the Call Status Window (CSW) display.

The following PlusTapi events that support DUX macro invocations is supported:
1. TapiEventActive—JavaPhone environment has been successfully initialized
2. TapiEventInactive—JavaPhone environment has not been successfully initialized
3. TapiEventMute—Microphone was muted
4. TapiEventUnMute—Microphone was unmuted
5. TapiEventHold—Call has been placed on hold
6. TapiEventUnhold—Call has been removed from hold
7. TapiEventReady—Agent has been made ready to accept new calls
8. TapiEventNotReady—Agent has been made not ready to accept new calls
9. TapiEventNotReadyPend—Agent is made not ready to accept new calls after the active call has been terminated.
10. TapiEventVolChange—the headset volume was altered
11. TapiEventGainChange—the microphone gain was altered
12. TapiEventCall—A call is active on the position
13. TapiEventoCall—No call is active on the position The above events will perform the internal DuxExecMacroAdvise command that will execute any macro previously identified with the Dux&tMacroAdvise command.

Through usage of the existing DuxSetMacroAdvise command, the position can be configured to update the Call Status Window with either text or an icon. For example, if the IWSP startup macro (configured in the Platform Setup utility) was defined to include the following commands:
1. DuxSetMacroAdvise(TapiEventHold, HoldMacro);
2. DuxSetMacroAdvise(TapiEventUnhold, UnholdMacro); and the "HoldMacro" was defined as:
InfoWinSetText(1, 0, "Call On Hold");

and the UnholdMacro was defined as:
InfoWinSetText(1, 0, " "), then the operator would have visual feedback whenever the call was placed on hold.

Similarly, the other DUX user exits in PlusTapi would be configured to display text in predefined InfoWin Fields. See the section Call Status Window for additional information.

The TapiEventActive advisement is made when PlusTapi establishes communications with the JavaPhone application. Similarly, the TapiEventInactive advisement is made whenever communications with the JavaPhone application (105, 4400) are lost.

Plus Tagi Utility Mode (FIG. 13)

The PlusTapi DLL (110, 6600) supports the IWSP utility mode in order to provide a means of setting the necessary configuration parameters. The FIG. 13 diagram depicts the PlusTapi utility mode panel.

The parameters are defined in the following table:

TABLE 2

PlusTapi DLL Utility Mode Parameters

| Utility Parameter | Definition |
| --- | --- |
| PlusTop conversation number for telephony support (1–8): | This parameter is used by PlusTapi in the "TcpOpen" command of the PlusTcp DLL. Valid values are 1–8. |
| TCP/IP address of telephony support: | This is the TCP/IP address of the JavaPhone application. This parameter can be set to the string "LocalHost" as a way of indicating that the JavaPhone application is resident on the same PC. |
| TCP/IP port number of telephony support: | This parameter specifies the numeric port number of the TCP/IP socket connection to the JavaPhone application. This value must match the value that the JavaPhone application is configured for. |
| Timeout value for initialization of telephony support (seconds): | This parameter controls the duration of the PlusTapi retry logic that is applied during startup when trying to establish a TCP/IP socket connection with (and initialization of) the JavaPhone application. |
| Timeout for establishing telephony connection (seconds): | This parameter controls the duration of the PlusTapi retry logic to request the connections between the JavaPhone application and the Voice Over Data Gateway and the Call Director. |
| Timeout for allowing operator to replug headset (seconds): | This parameter indicates the number of seconds that the system will allow for the operator to replug a headset that is removed during an active call. If the headset is not replugged during the specified time, the PlusTapi DLL will attempt to transfer the call to another available operator and then logoff the operator. |
| TCP/IP Address of Call Director Custom Server. | This is the TCP/IP address of the system that is running the Call Director Custom Server application |
| TCP/IP Address of Voice Over Data Custom Server. | This is the TCP/IP address of the system that is running the Voice Over Data Custom Server application |

PlusTapi Diagnostic Support

PlusTapi includes embedded calls to the existing diagnostic support generating the following possible log entries:
1. Traces of the raw data sent to the PlusTcp module
2. Traces of the raw data received from the PlusTcp module
3. Any error conditions detected
4. ASCII entries for each command sent to and response received from the JavaPhone application
5. ASCII entries of any events triggered (Threshold level Call Status Window (CSW)

The InfoWin is utilized for defining a display window containing the various call status indicators. This window is referred to as the "Call Status Window" (CSW).

FIG. 18 illustrates an exemplary definition of an InfoWin (as it might appear in the InfoWin DLL utility) for usage as a CSW. With this example, InfoWin Field 1 could be used for displaying whether the microphone is muted while InfoWin Field2 could indicate whether the call is on hold. FIG. 19 illustrates what the CSW might look when the InfoWin DLL is run in IWSP Normal Mode.

In this example, InfoWin Field 1 is displaying a "hold" indication, InfoWin Field 2 is displaying a "mute" indicator. InfoWin Field 3 is displaying whether there is a "call active", while InfoWin Fields 4–7 display the called and calling numbers. Field 13 could be utilized for displaying "Not Ready" text.

All of the displays shown are strictly provided for demonstration purposes as the customer would be free to customize the content and format of the Call Status Window using a combination of the following available features:
1. DISP macro advisement events
2. PlusTapi macro advisement events
3. InfoWin DLL Utility
4. InfoWin SetText command
5. InfoWin ShowEData command.

Method

The system block diagrams illustrated in FIGS. 1–6 may be utilized by one skilled in the art in conjunction with the data flow diagrams of FIGS. 7–19 to generate appropriate flowcharts that describe a corresponding method of implementing the programmable agent workstation. One skilled in the art will recognize that these steps may be rearranged and/or augmented with no loss of generality in the teachings of the present invention.

The teachings of the present invention are sufficiently broad to not limit the manner in which the above-mentioned steps are to be performed as well as not limiting the method to any particular hardware, operating system, API, or graphical user interface. Thus, while the particular information gathered within the context of FIGS. 1–20 and the specific function calls listed in the exemplary flow diagrams are preferred for some embodiments, they are by no means Limitive of the present invention teachings or the scope thereof.

Computer Software

As would be known by one skilled in the art and as indicated in the exemplary embodiments above, the system and method described herein and generally illustrated in FIGS. 1–20 may be reduced to computer instruction codes and embodied on a computer readable storage means. This may take the form of a wide variety of storage media well known in the art and/or contemplated for future use. Thus, the present invention specifically anticipates the incorporation of the system and methods discussed herein in the form of tangible computer software products.

Furthermore, while not limiting the scope of the present invention, the present invention specifically anticipates that one or more components of the present invention may be implemented using the Microsoft® Windows™ operating environment and/or the IBM AIX operating environment in all their variations or their equivalent commercial embodiments, including but not limited to any system incorporating a graphical user interface.

CONCLUSION

A programmable workstation system and method for network based call center with telephony functions provided over the IP network and using a personal computer is disclosed. For such automated call centers there exists a need to coordinate the telephony functions with agent availability functions. Existing solutions use a switch and PSTN phone to communicate information to an automated call director (ACD). The present invention solves the problem of doing similar reporting and with coexistence of telephony functions along with agent data functions.

Features of invention include (a) special protocols to relay agent information to Virtual ACD and coexist with H.323 signaling and (b) the ability to relay agent status and provide screen based interface to agent also for such information for agent availability and alerting. The system disclosed generally incorporates JavaPhone (105, 4400), PlusTcp (109, 5500), and PlusTapi (110, 6600) APIs with associated method functions to implement the major functions of the invention.

Figure 20:
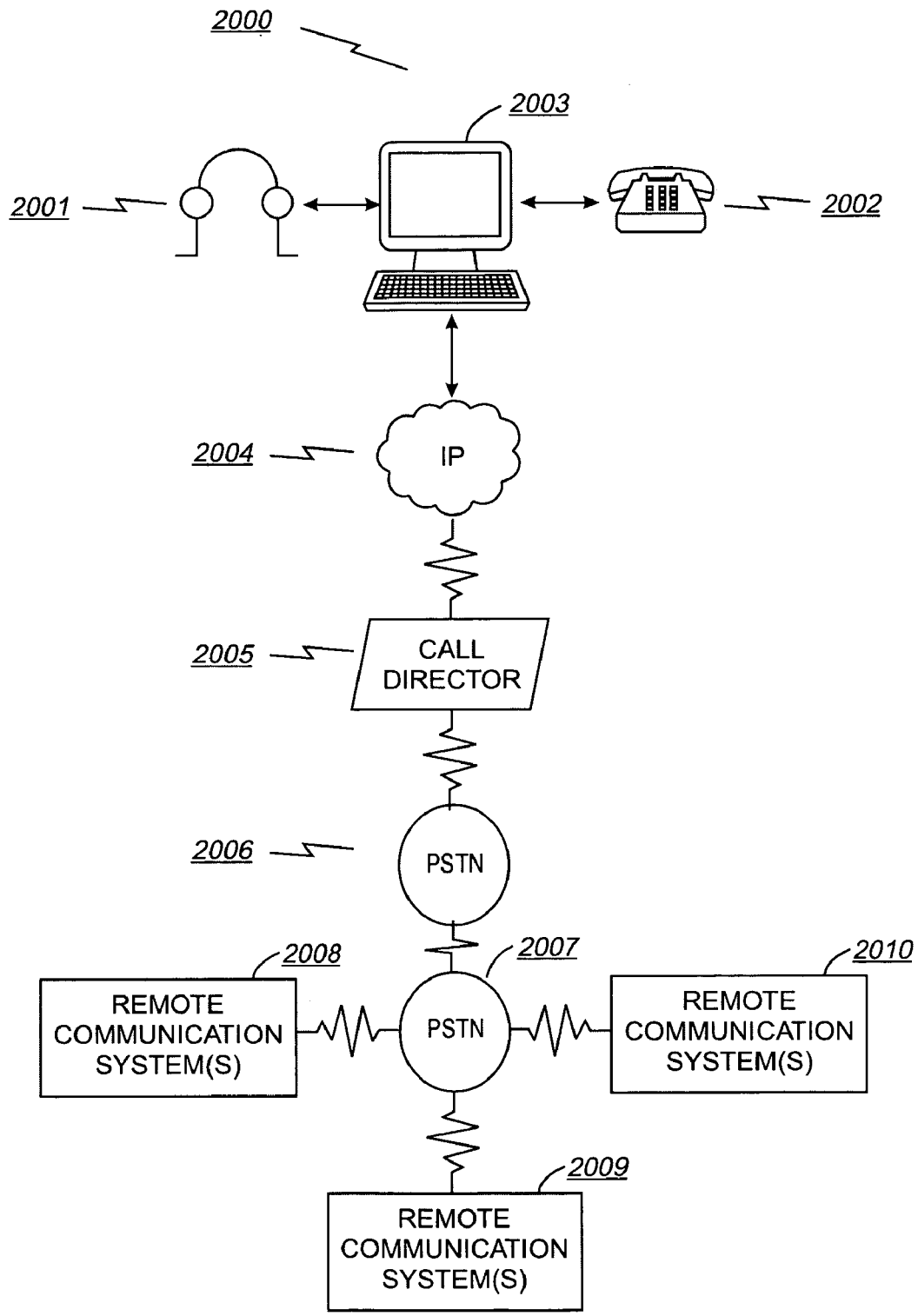
FIG. 20 illustrates an exemplary data flow illustrating how the present invention may be used to access multiple remote communication systems.

As illustrated in FIG. 20, while the foregoing discussion has been limited to single-call applications, the present invention is capable of wide application in environments where the agent workstation (2003) communicates with a wide variety of remote communication systems (2008, 2009, 2010) using a wide variety of protocols and data types.

Although a preferred embodiment of the present invention has been illustrated in the accompanying Drawings and described in the foregoing Detailed Description, it is understood that the invention is not limited to the embodiments disclosed, but is capable of numerous rearrangements, modifications, and substitutions without departing from the spirit of the invention as set forth and defined by the following claims.

What is claimed is:

1. A programmable agent workstation system in a directory assistance system (DAS) network, comprising:
 (a) a JavaPhone means;
 (b) a PlusTcp means; and
 (c) a PlusTapi means;
 wherein
 said JavaPhone means provides a JavaPhone with audio support in an Intelligent Workstation Platform (IWSP) including audio controls/status and/or call controls/status;
 said PlusTcp means provides TCP/IP communication support for local socket connections to said JavaPhone means, wherein the local socket connection is used for communicating both audio and call control operations between the JavaPhone means and the IWSP and a call director without the use of a Call Processing Gateway (CPG) and call processing switch used to route telephony, while maintaining compatibility with the H.323 protocol;
 said PlusTapi means enumerates commands and data items to the IWSP to allow a Directory Assistance (DA) operator to communicate with said JavaPhone means and perform related audio and call control operations including all switch related messaging, wherein said PlusTapi means is independent of an interface between the ISWP and the CPG, and the PlusTcp means and the PlusTapi means are implemented within a single application programming interface (API) so that each of the JavaPhone means and the PlusTapi means are usable under a single program process.

2. The programmable agent workstation system of claim 1 wherein the PlusTcp means and the PlusTapi means are implemented within a single application programming interface (API) that includes the PlusTcp means.

3. The programmable agent workstation system of claim 1 wherein said TCP/IP communication occurs between PC-to-phone endpoints.

4. The programmable agent workstation system of claim 1 wherein said TCP/IP communication occurs between phone-to-PC endpoints.

5. The programmable agent workstation system of claim 1 wherein said TCP/IP communication occurs between phone-to-phone endpoints.

6. The programmable agent workstation system of claim 1 wherein one or more components of said system is implemented on a personal computer (PC).

7. The programmable agent workstation system of claim 6 wherein said personal computer (PC) utilizes a graphical user interface.

8. The programmable agent workstation system of claim 1 wherein said JavaPhone means further comprises one or more of the following:
 (a) a volume up/down means;
 (b) a microphone mute/unmute means;
 (c) a raise/lower microphone gain means;
 (d) a headset unjacking detection means;
 (e) a sign on/off control/status means;
 (f) a call arrival indication means;
 (g) a call termination indication means;
 (h) a call conferencing means;
 (i) a make busy control means; and
 (j) a hold/unhold call control means.

9. The programmable agent workstation system of claim 8 wherein one or more components of said system is implemented within an application programming interface (API).

10. The programmable agent workstation system of claim 8 wherein one or more components of said system is implemented on a personal computer (PC).

11. The programmable agent workstation system of claim 10 wherein said personal computer (PC) utilizes a graphical user interface.

12. The programmable agent workstation system of claim 1 wherein said PlusTcp means further comprises one or more of the following:
 (a) a TcpOpen means;
 (b) a TcpClose means;
 (c) a TcpSend means;
 (d) a TcpRecv means;
 (e) a TcpGetLastError means; and
 (f) a TcpGetError String means.

13. The programmable agent workstation system of claim 12 wherein one or more components of said system is implemented within an application programming interface (API).

14. The programmable agent workstation system of claim 12 wherein one or more components of said system is implemented on a personal computer (PC).

15. The programmable agent workstation system of claim 14 wherein said personal computer (PC) utilizes a graphical user interface.

16. The programmable agent workstation system of claim 1 wherein said PlusTapi means further comprises one or more of the following:
 (a) a TapiMakeCall means;
 (b) a TapiHoldCall means;
 (c) a TapiUnholdCall means;
 (d) a TapiBlindXferCall means;
 (e) a TapiRetrieveCall means;
 (f) a TapiDisconnect means;
 (g) a TapiBlindConfCall means;
 (h) a TapiLogon means;
 (i) a TapiLogoff means;
 (j) a TapiDTMF means;
 (k) a TapiNotReady means;
 (l) a TapiReady means;
 (m) a TapiVolumeSet means;
 (n) a TapiSetProperty means;
 (O) a TapiGetProperty means;
 (p) a TapiShutdown means;
 (q) a TapiPing means;
 (r) a TapiHoldToggle means;
 (s) a TapiReadyToggle means;
 (t) a TapiMuteToggle means;
 (u) a TapiVolumeUp means;
 (v) a TapiVolumeDown means;
 (w) a TapiMicGainUp means;
 (x) a TapiMicGainDown means;
 (y) a TapiMicGainSet means; and
 (z) a TapiDisplayErrs means.

17. The programmable agent workstation system of claim 16 wherein one or more components of said system is implemented within an application programming interface (API).

18. The programmable agent workstation system of claim 16 wherein one or more components of said system is implemented on a personal computer (PC).

19. The programmable agent workstation system of claim 18 wherein said personal computer (PC) utilizes a graphical user interface.

20. A programmable agent workstation method comprising:

(1) processing Voice Over IP (VoIP) data TCP/IP communications in support of local socket connections with a PlusTcp means, wherein the local socket connection is used for communicating both audio and call control operations between a JavaPhone means and a programmable agent workstation and a call director without the use of a Call Processing Gateway (CPG) and call processing switch used to route telephony, while maintaining compatibility with the H.323 protocol;
 (2) processing user call audio control/status and call controls/status with the JavaPhone means, with a JavaPhone for providing audio support in the programmable agent workstation;
 (3) processing user interface commands and data items to the programmable agent workstation to allow a Directory Assistance (DA) operator control/status with a PlusTapi means including all switch related messaging;
 wherein
 said processing may be performed synchronously and/or asynchronously, and
 said PlusTapi means is independent of an interface between the programmable agent workstation and the CPG, and the PlusTcp means and the PlusTapi means are implemented within a single application programming interface (API) so that each of the JavaPhone means and the PlusTapi means are usable under a single program process.

21. The programmable agent workstation method of claim 20 wherein the PlusTcp means and the PlusTapi means are implemented within the single application programming interface (API) that includes the PlusTcp means.

22. The programmable agent workstation method of claim 20 wherein one or more steps is implemented on a personal computer (PC).

23. The programmable agent workstation method of claim 22 wherein said personal computer (PC) utilizes a graphical user interface.

24. A computer usable medium having computer-readable program code means providing programmable agent workstation functionality in a directory assistance (DAS) network, said computer-readable program means comprising:
 (1) computer program code means for processing Voice Over IP (VoIP) data TCP/IP communications in support of local socket connections with a PlusTcp means, wherein the local socket connection is used for communicating both audio and call control operations between a JavaPhone means and a programmable agent workstation and a call director without the use of a Call Processing Gateway (CPG) and call processing switch used to route telephony, while maintaining compatibility with the H.323 protocol;
 (2) computer program code means for processing user call audio control/status and call controls/status with the JavaPhone means with a JavaPhone for providing audio support in the programmable agent
 (3) computer program code means for processing user interface commands and data items to the programmable agent workstation to allow a Directory Assistance (DA) operator control/status with a PlusTapi means including all switch related messaging;
 wherein
 said processing may be performed synchronously and/or asynchronously, and said PlusTapi means is independent of an interface between the programmable agent workstation and the CPG, and the PlusTcp means and the PlusTapi means are implemented within a single application programming interface (API) so that each of the JavaPhone means and the PlusTapi means are usable under a single program process.

25. The computer usable medium of claim 24 wherein said medium is compatible with a personal computer (PC).

26. The computer usable medium of claim 25 wherein said computer code means utilizes a graphical user interface.

* * * * *